(12) United States Patent
Fukuda

(10) Patent No.: US 8,656,164 B2
(45) Date of Patent: Feb. 18, 2014

(54) AUTHENTICATION SYSTEM

(75) Inventor: Naohiro Fukuda, Funabashi (JP)

(73) Assignee: Panasonic Corporation, Osaka (JP)

( * ) Notice: Subject to any disclaimer, the term of this patent is extended or adjusted under 35 U.S.C. 154(b) by 123 days.

(21) Appl. No.: 13/380,792

(22) PCT Filed: Jun. 23, 2010

(86) PCT No.: PCT/JP2010/060643
§ 371 (c)(1),
(2), (4) Date: Dec. 23, 2011

(87) PCT Pub. No.: WO2010/150817
PCT Pub. Date: Dec. 29, 2010

(65) Prior Publication Data
US 2012/0096266 A1 Apr. 19, 2012

(30) Foreign Application Priority Data
Jun. 23, 2009 (JP) ................................. 2009-148960

(51) Int. Cl.
*H04L 9/32* (2006.01)

(52) U.S. Cl.
USPC .......................................................... 713/168

(58) Field of Classification Search
USPC .......................................................... 713/168
See application file for complete search history.

(56) References Cited

U.S. PATENT DOCUMENTS

| | | | |
|---|---|---|---|
| 5,729,608 A | 3/1998 | Janson et al. | |
| 2002/0126850 A1* | 9/2002 | Allen et al. | 380/277 |
| 2006/0294594 A1* | 12/2006 | Andreaux et al. | 726/26 |
| 2007/0118879 A1 | 5/2007 | Yeun | |
| 2008/0313468 A1 | 12/2008 | Yoshikawa | |

FOREIGN PATENT DOCUMENTS

| | | |
|---|---|---|
| JP | 3078841 B2 | 8/2000 |
| JP | 2007-228501 A | 9/2007 |
| JP | 2008-310506 A | 12/2008 |

OTHER PUBLICATIONS

International Search Report for Application No. PCT/JP2010/060643 mailed Jul. 27, 2010.
Nukui, Harumi, "Security Gijutsu", Toshiba Review, 1992, vol. 47, No. 6, pp. 491-494.
Steiner, Jennifer et al., "Kerberos: An Authentication Service for Open Network Systems", In Proceedings of the Winter 1988 Usenix Conference, 1988, pp. 18-28.

* cited by examiner

*Primary Examiner* — Jacob Lipman
(74) *Attorney, Agent, or Firm* — Renner, Otto, Boisselle & Sklar, LLP

(57) ABSTRACT

The authentication system includes a user node, a plurality of service nodes, an authentication database storage unit, an authentication unit, a user information database storage unit, and a key distribution unit. Each service node is configured to provide a service corresponding to its domain. The authentication database storage unit is configured to store a secret key of the user node for each domain. The user information database storage unit is configured to store an account used for associating a domain with the user node. The key distribution unit is configured to, upon receiving a domain change request from the user node and then confirming that the user information database stores the account associating the user node with a desired domain to which the user node intends to belong, obtain the secret key of the user node associated with the desired domain from the authentication database storage unit, and send the obtained secret key to the user node. The authentication unit is configured to create a session key, and encrypt the created session key with the secret key corresponding to the desired domain, and send the encrypted session key to the user node.

6 Claims, 8 Drawing Sheets

AUTHENTICATION SYSTEM

TECHNICAL FIELD

The present invention is directed to an authentication system including nodes connected to an information communication network as terminals, the authentication system being configured to, when one node requests another node to provide a service, authenticates nodes in association with the service in order to enable secure communication between the nodes for preventing a third person from abusing the service.

BACKGROUND ART

When nodes are connected to an information communication network (e.g., the Internet, and a home network) as terminals, and when one node receives a service from the other node (or a part of functions of the other node), a communication message between the node as a service providing side and the node as a service receiving side is encrypted in order to prevent an authorized person from abusing the service.

Additionally, a common session key distributed to the node as the service providing side and the node as the service receiving side is used as an encryption key for encrypting the communication message. In a process of distributing such a session key to each node, it is required to deliver the session key with keeping the session key secret from an unauthorized person.

In order to fulfill the above requirement, there has been proposed an authentication system performing authentication in a common key encryption manner by use of a trusted third-party organization and then distributing the session key. For example, the KryptoKnight is known as such an authentication method (e.g., Japanese patent publication No. 3078841).

According to such an authentication manner, the common session key is distributed to a node as a communication initiator and a node as a communication responder. Here, authenticating means acting as the third party organization creates a session key, and generates, for each node, an encryption message including the session key by use of an encryption key of a corresponding node. Thereby, it is possible to distribute the session key to each node in a secure manner. In other words, the session key created by the authenticating means is sent to each node as an encryption message designed not to be decrypted by use of anything but the secret key retained by a corresponding node. Therefore, it is enabled to deliver the session key common to the nodes to each node in a secure manner.

A push scenario and a pull scenario are known as an authentication method. Regarding the push scenario, the node as the initiator receives the encryption message including the session key common to the node as the initiator and the node as the responder from the authenticating means. The node as the initiator decrypts the encryption message to obtain the session key. The node as the initiator receives the encryption message for the node as the responder from the authenticating means, and transfers the received encryption message to the node as the responder. Concerning the pull scenario, the node as the initiator requests the authenticating means through the node as the responder to distribute the session key. As a result, the node as the responder receives the encryption message including the session key from the authenticating means, and decrypts the encryption message for the node as the responder. Further, the node as the responder receives the encryption message for the node as the initiator from the authenticating means, and transfers the received encryption message to the node as the initiator.

With regard to the authentication in line with the common key encryption manner, the secret key common to the authenticating means and the node is recorded in the authenticating means any way. The secret key is recorded for each node. The authenticating means creates the encryption message containing the session key by use of secret key of each node, and sends it to each corresponding node. Therefore, it is possible to send the session key with respect to each node. In brief, since the common session key is distributed to the multiple nodes, it is enabled to establish secure communication between the nodes by use of the message encrypted with the session key. However, a single secret key is recorded in the authenticating means for each node. Thus, it is enabled to form only one domain within the information communication network.

In order to provide a different service per domain including nodes, and to enable a node to change a service provided, it is necessary to provide the authenticating means for each domain, and each node requires plural secret keys respectively corresponding to domains. In brief, in order to enable change of a service provided to a node, it is necessary to provide the plural authenticating means. Further, a node needs to select the authenticating means in accordance with the desired service and requires the selected authenticating means to perform authentication in order to obtain the session key.

In brief, the node needs to select the secret key in accordance with the desired service and access the authenticating means by use of the selected secret key in order to request the authentication. Therefore, it is very troublesome to change the service. In other words, the node needs to select the secret key and the authenticating means in order to change the service provided to the node. Thus, the user of the node suffers from the complicated process required for obtaining the session key by use of the node.

DISCLOSURE OF INVENTION

In view of the above insufficiency, the present invention has been aimed to propose an authentication system which can define a domain determining, based on a service, an extent where a node is permitted to communicate with another node and can enable the node to easily obtain a session key used in the domain in response to change of the service which the node tries to receive.

The authentication system in accordance with the present invention includes: a user node adapted to be used by a user; a plurality of service nodes each configured to provide a service corresponding to its domain; an authentication database storage unit; an authentication unit; a user information database storage unit; and a key distribution unit. The authentication database storage unit is configured to store an authentication database in which a secret key of the user node is preliminarily registered for each domain. The secret key of the user node is configured to differ according to a domain. The user information database storage unit is configured to store a user information database in which an account used for associating a domain with the user node is registered. The user node is configured to send a domain change request to the key distribution unit via an information communication network in order to request changing from a current domain to which the user node belongs to a desired domain to which the user node intends to belong. The key distribution unit is configured to, upon receiving the domain change request from the user node, check whether or not the user information database stores the account associating the desired domain with the user node. The key distribution unit is configured to, upon acknowledging that the user information database stores the account associating the desired domain with the user node, obtain the secret key of the user node associated with the desired domain by user of the authentication database stored in the authentication database storage unit, and send the obtained secret key to the user node via the information communication network. The authentication unit is configured to, after the user node obtains the secret key corresponding to the desired domain, create a session key used for encryption communication between the user node and the service node belonging to the desired domain within the desired domain, and encrypt the created session key with the secret key corresponding to the desired domain, and send the encrypted session key to the user node via the information communication network.

In a preferred aspect, the authentication system further includes a registration unit connected to the user information database storage unit. The registration unit is configured to register the account in the user information database in response to manipulation of an input device adapted to be used by the user.

In a more preferred aspect, the plurality of the nodes includes a cooperation service node configured to provide a service in which the cooperation service node cooperates with the user node. The registration unit is configured to register a set of the user node and the cooperation service node in the user information database as a group in response to manipulation of the input device. The key distribution unit is configured to, upon receiving the domain change request from the user node, check whether or not the user information database stores the account associating the desired domain with the user node and also stores the group indicative of the set of the user node and the cooperation service node belonging to the desired domain. The key distribution unit is configured to, upon acknowledging that the user information database stores the account associating the desired domain with the user node and also stores the group indicative of the set of the user node and the cooperation service node belonging to the desired domain, obtain the secret key of the user node associated with the desired domain by user of the authentication database stored in the authentication database storage unit, and send the obtained secret key to the user node via the information communication network.

In a preferred aspect, the key distribution unit is configured to, upon receiving an acknowledgement from the user node after sending the secret key corresponding to the desired domain to the user node in response to the domain change request, delete the secret key corresponding to the current domain from the authentication database.

In a preferred aspect, the user node is configured to, upon acknowledging that the user node no longer receives the session key corresponding to the current domain from the authentication unit, request the session key corresponding to the other domain in line with an order preliminarily determined with regard to the domain to which the user node belongs.

In a preferred aspect, the service node is configured to provide the services of different classes. The authentication database is configured to store access restriction information for performing access restriction for each service provided by the service node. The authentication unit is configured to send the access restriction information to the user node and the service node when distributing the session key to the user node and the service node.

BEST MODE FOR CARRYING OUT THE INVENTION

The following explanation is made to the present embodiment which indicates an instance where plural domains are defined regarding an information communication network and where a user can change a domain including a node managed by the user. A domain including a node is decided by distributing a session key corresponding to the domain to the node from an authentication unit.

Figure 1:
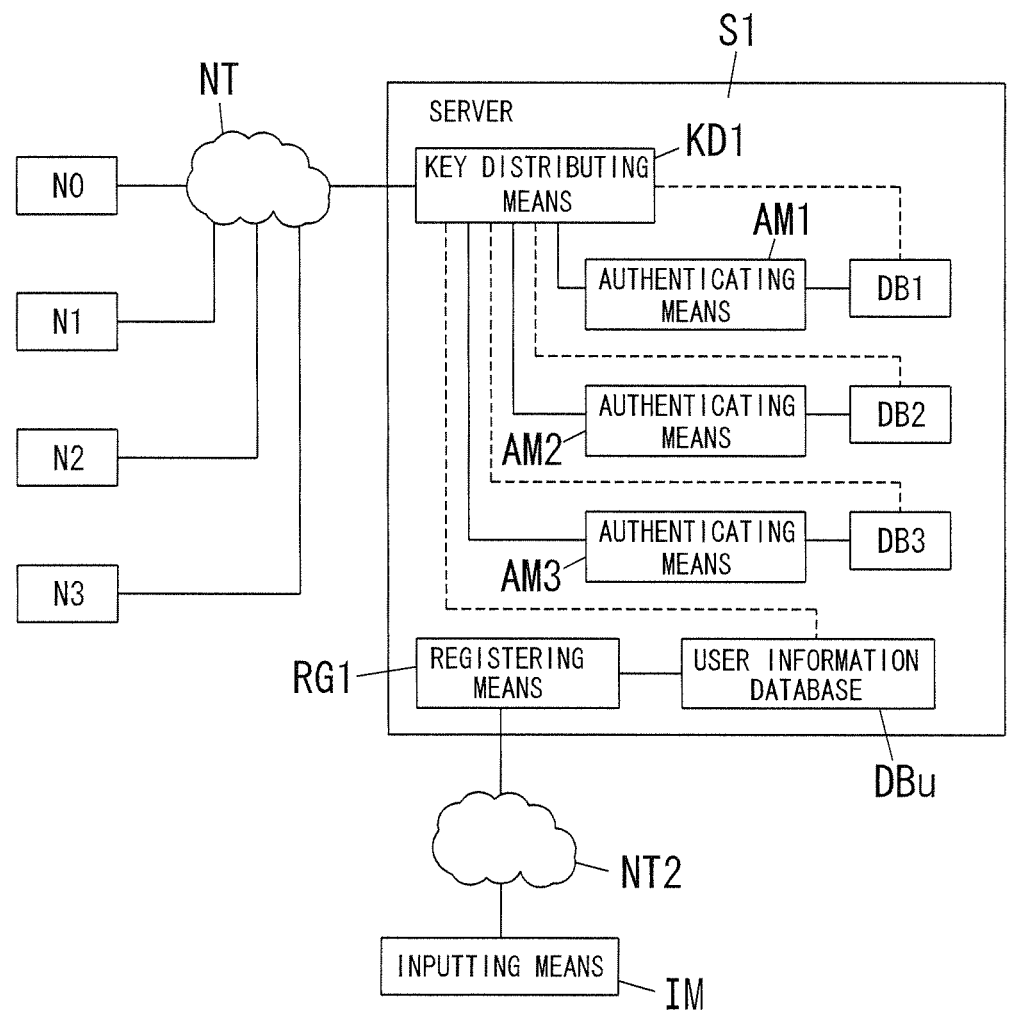
FIG. 1 is a diagram illustrating a configuration of a system used for implementing the present invention.

As shown in FIG. 1, the present explanation is made to an instance where three domains D are provided. In order to distinguish among the three domains D, the three domains D are designated by reference numerals D1, D2, and D3, respectively, as necessary. However, the number of the domains D may be two, four, or more. In addition, the illustrated instance shows four nodes N. The number of the nodes N is not limited. Besides, in order to distinguish among the four nodes N, the four nodes N are designated by reference numerals N0, N1, N2, and N3, respectively, as necessary.

In the illustrated instance, the node N0 selected from the nodes N0 to N3 is a node focused in the following explanation. The node N0 is assumed to be a device in a home network system. In other words, the node N0 is used by a user. Therefore, the node N0 is defined as a user node Nu configured to be used by the user.

The nodes N1, N2, and N3 belong to the domains D1, D2, and D3, respectively. Each of the nodes N1 and N2 is a server used in the home network system, and is assumed to be a home server installed in a residence, a server used by a device manufacturer or a manager, or the like. Therefore, the nodes N1 and N2 provide a service to the node N0 in an extent of their domains D1 and D2, respectively. The node N3 cooperates with the node N0 in an extent of the domain D3. The operation performed by the node N3 in cooperation with the node N1 can be treated as a service which the node N3 provides to the node N0. Therefore, each of the nodes N1 to N3 is defined as a node (service node) Ns configured to provide a service. Each of the nodes N1 to N3 may provide services of the same type. Alternatively, each of the nodes N1 to N3 may provide services of various types.

Each of the nodes N0 to N3 is connected to an information communication network NT such as the Internet and a home network. The nodes N0, N1, N2, and N3 have identifiers ID0, ID1, ID2, and ID3, respectively. The desired node N can be identified by use of corresponding one selected from the identifiers ID0 to ID3. Moreover, each of the nodes N0 to N3 is configured to communicate with a server S1 via the information communication network NT.

The server S1 has a function of associating the node N0 with the node (N1 to N3) in order to enable the node N0 to receive a service provided from the node (N1 to N3). The detailed explanation with regard to the function of the server "S1" is mentioned below.

In the following explanation, a unit having a function in the information communication network is treated as an "object". In the present embodiment, a class of the object is categorized into a user of the node N0, a service provided to a user, and a host (server S1) configured to define a relation between a user and a service.

A user of the node N0 is distinguished from users of other nodes by use of the identifier of the node N0. The domain D to which the node N0 belongs is decided when the server S1 authenticates a combination of the identifier ID0 of the node N0 and the domain D to which the node N0 intends to belong. As described below, an identifier (service identifier) is allocated to each service provided by each of the nodes N1 to N3. The service which the node N0 receives is identified when the server S1 authenticates a combination of the service identifier and the domain D.

In the present embodiment, in order to receive the service provided by the desired node Ns, the node N0 requires the session key common to the node N0 and the desired node Ns. The session key is provided to the node N0 from an authentication means (authentication server) AM included in the server S1. The node N0 can communicate with the desired node Ns in a secure manner by establishing encryption communication using the session key. Besides, the three authentication units AM are distinguished by use of reference numerals AM1 to AM3, if necessary.

The authenticating means AM1, AM2, and AM3 are associated with the domains D1, D2, and D3, respectively. Therefore, the authenticating means AM1 is configured to create the session key of the domain D1. The authenticating means AM2 is configured to create the session key of the domain D2. The authenticating means AM3 is configured to create the session key of the domain D3. The session key is available in the extent of only the domain D associated with the authenticating means AM which creates this session key. Therefore, the domain D to which the node N0 belongs is decided by the session key distributed to the nodes N.

The server S1 includes authentication databases DB1 to DB3 and a key distribution unit KD1 in addition to the authenticating means AM1 to AM3. The authentication database (DB1 to DB3) stores the identifier (ID0 to ID3) of the node (N0 to N3) belonging to the domain (D1 to D3) in association with a secret key which the node (N0 to N3) uses in the domain (D1 to D3). The key distribution unit KD1 is defined as a proxy service distributing, to the node N0, the secret key shared with the node (N0 to N3).

Figure 8:
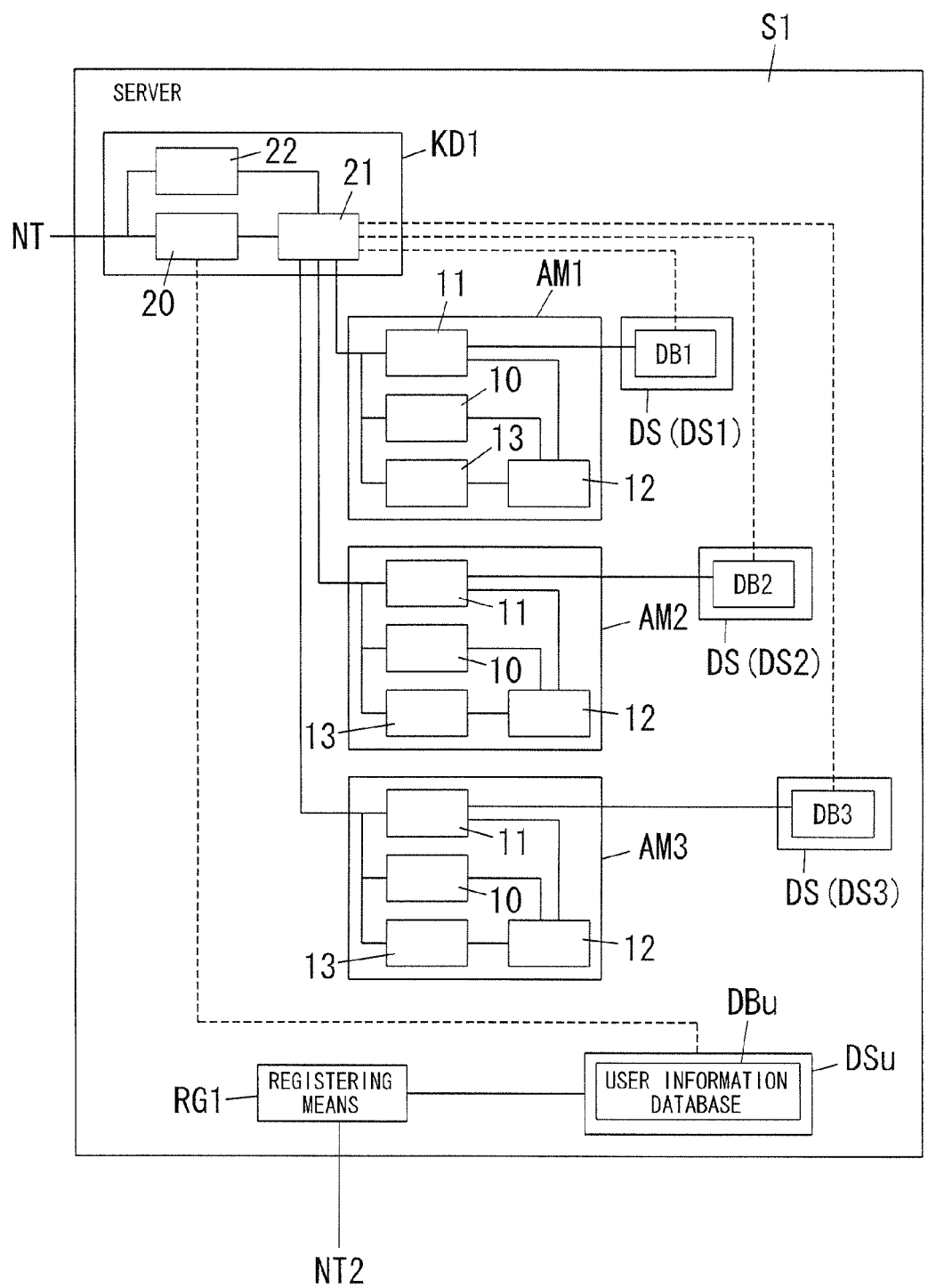
FIG. 8 is a diagram illustrating a configuration of a server used in the above system.

In other words, as shown in FIG. 8, the server S1 includes three authentication database storing means DS and the key distributing means (key distribution unit) KD1 in addition to the authenticating means AM1 to AM3. Besides, the three authentication database storing means DS are distinguished by used of reference numerals DS1, DS2, and DS3.

The authentication database storing means DS1 is configured to store the authentication database (first authentication database) DB1 corresponding to the domain D1. The secret key used by the node N0 in the domain D1 is recorded in the first authentication database DB1 in association with the identifier ID0 of the node N0. The secret key used by the node N1 in the domain D1 is stored in the first authentication database DB1 in association with the identifier ID1 of the node N1.

The authentication database storing means DS2 is configured to store the authentication database (second authentication database) DB2 corresponding to the domain D2. The secret key used by the node N0 in the domain D2 is stored in the second authentication database DB2 in association with the identifier ID0 of the node N0. The secret key used by the node N2 in the domain D2 is recorded in the second authentication database DB2 in association with the identifier ID2 of the node N2.

The authentication database storing means DS3 is configured to store the authentication database (third authentication database) DB3 corresponding to the domain D3. The secret key used by the node N0 in the domain D3 is registered in the third authentication database DB3 in association with the identifier ID0 of the node N0. Further, the secret key used by the node N3 in the domain D3 is recorded in the third authentication database DB3 in association with the identifier ID3 of the node N3.

In the present embodiment, the three authentication database storing means DS constitute an authentication database storage unit. The authentication database storage unit an authentication database DB consisting of the first to third authentication databases DB1 to DB3. The secret key of the node N0 is preliminarily registered in the authentication database DB with regard to each domain D.

The key distributing means KD1 is configured to perform the proxy service of distributing, to the node N0, the session key shared with the node (N0 to N3).

According to the present embodiment, the different secret key is associated with the single node N0 for each domain D in the authentication database DB. As to the domain D2, the two different secret keys are associated with the node N0. In the following embodiment, with regard to the node N0, the secret keys K0-1 is preliminarily registered in the first authentication database DB1, and the secret keys K0-21 and K0-22 are preliminarily registered in the second authentication database DB2, and the secret key K0-3 is preliminarily registered in the third authentication database DB3. The secret key K0-N indicates a secret key for the node N0. The difference in "–N" denotes different one of the secret key. That is, four kinds of the secret keys K0-1, K0-21, K0-22, and K0-3 are associated with the node N0. One secret key is selected from the four kinds of the secret keys in accordance with a state (the domain D to which the node N0 belongs) of the node N0.

The aforementioned secret key is preliminarily recorded in the authentication database DB (DB1 to DB3) by the manufacturer of the node N, for example. In the server S1, the authenticating means AM1 is permitted to refer to the first authentication database DB1, and the authenticating means AM2 is permitted to refer to the second authentication database DB2, and the authenticating means AM3 is permitted to refer to the third authentication database DB3. Further, the key distributing means KD1 is allowed to refer to all the authentication databases DB. In addition, the server S1 a user information database storing means (user information database storage unit) DSu and a registering means (registration unit) RG1.

The authenticating means (authentication unit) AM includes a session key creation module 10, a secret key obtaining module 11, an encryption module 12, and a session key sending module 13.

The session key creation module 10 is configured to, upon receiving, via the information communication network NT, a session key distribution request from the user node Nu or the specific service node Ns defined as the service node Ns providing its service to the user node Nu, create the session key used for the encryption communication between the user node Nu and the specific service node Ns.

The secret key obtaining module 11 is configured to, upon receiving the session key distribution request, refer to the authentication database DB stored in the authentication database storage unit, and obtain the secret key (first secret key) of the user node Nu corresponding to the domain D including the specific service node Ns as well as the secret key (second secret key) of the specific service node Ns.

The encryption module 12 is configured to encrypt the session key created by the session key creation module 10 with the first secret key of the user node Nu obtained by the secret key obtaining module 11 so as to create a user encryption message. In addition, the encryption module 12 is configured to encrypt the session key crated by the session key creation module 11 with the second secret key of the specific service node Ns obtained by the secret key obtaining module 11 so as to create a service encryption message.

The session key sending module 13 is configured to send the user encryption message created by the encryption module 12 to the user node Nu via the information communication network NT, and to send the service encryption message created by the encryption module 12 to the specific service node Ns via the information communication network NT.

The user node Nu stores the first secret key corresponding to the current domain D defined as the domain to which the user node Nu belongs. The user node Nu is configured to, upon receiving the user encryption message from the session key sending module 13 of the authenticating means AM, decrypt the user encryption message with the first secret key stored in the user node Nu. Thus, the user node Nu acquires the session key from the authenticating means AM.

The service node Ns stores the second secret key corresponding to the domain D to which the service node Ns belongs. The service node Ns is configured to, upon receiving the service encryption message from the session key sending module 13 of the authenticating means AM, decrypt the service encryption message with the second secret key stored in the service node Ns. Thus, the service node Ns acquires the session key from the authenticating means AM. Besides, the service nodes Ns retain the different second secret keys.

The fact that the user node Nu can obtain the same session key as the service node Ns means that the user node Nu and the service node Ns belong to the same domain D.

The user information database storage unit DSu is configured to store a user information database DBu designed to record an account associating the user node Nu with the domain D.

The user node Nu is configured to, when the user node Nu requests changing from the current domain D (e.g., the domain D1) including the user node Nu to the desired domain D (e.g., the domain "D2") to which the user node Nu intends to belong, send a domain change request indicative of the desired domain D to the key distributing means KD1 via the information communication network NT.

The key distributing means KD1 includes an account check module 20, a secret key request module 21, and a secret key sending module 22.

The account check module 20 is configured to, upon receiving the domain change request, check whether or not the user information database DBu has the account which associates the user node Nu with the desired domain D.

The secret key request module 21 is configured to, upon acknowledging that the account check module 20 has judged that the user information database DBu stores the account associating the desired domain D with the user node Nu, obtain the first secret key of the user node Nu corresponding to the desired domain D with reference to the authentication database DB stored in the authentication database storing means.

The secret key sending module 22 is configured to send the first secret key of the user node Nu obtained by the secret key request module 21 to the user node Nu via the information communication network NT.

The user nod Nu is configured to, upon receiving the first secret key from the secret key sending module 22 of the key distributing means KD1, store the received first secret key as the secret key corresponding to the current domain D.

The user node Nu can obtain the first secret key corresponding to the desired domain D from the key distributing means KD1 by means of sending the domain change request to the key distributing means KD1. As a result, the user node Nu is permitted to receive, from the authenticating means AM, the same session key as the service node Ns belonging to the desired domain D.

In the present embodiment, the service provided to the node N0 differs for each of the domains D1 to D3. The node N0 can receive the service from the respective domains D1, D2, and D3. The service of the domain D3 is ranked higher than the domain D2, and the service of the domain D2 is ranked higher than the domain D1. The service of each of the domains D1 to D3 is independent from the service of the other domains. Generally, the service which the node N0 can receive is different in accordance with the domain D to which the node N0 belongs. However, when the domains D1 to D3 constitute a layered architecture, the node N0 which belongs to the top level domain D3 may receive the service of each of the low level domains D1 and D2 in addition to the service of the domain D3. Further, when the node N0 belongs to the domain D2, the node N0 may receive the service of the domains D1 and D2. In other words, the node N0 may receive the high level service from the standard domain defined as the domain D to which the node N0 belongs. As necessary, the node N0 may receive the low level service by means of temporarily changing from the standard domain to the low level domain D.

In the present embodiment, the service which the node N0 belonging to the domain D can receive is defined as follows. When the node N0 belongs to the domain D1, the node N0 can receive the minimal service such as a firmware update service. When the node N0 belongs to the domain D2, the node N0 can receive the service of expanding the function in exchange for payment. For example, the service of the domain D2 provides a program of adding the new function to the node N0. With regard to the service of the domains D1 and D2, the node N0 operates solely. In the domain D3, it is possible to provide a service of permitting the node N0 to form a group together with other nodes. In other words, the node N0 can cooperate with other nodes in the same group.

1. Example where User is not Limited

In an initial state, the node N0 is connected to the information communication network NT first after being shipped from a factory. When the node N0 is connected to the information communication network NT and is activated, the node N0 announces an entry to other nodes via the information communication network NT. The server S1 receives the entry of the node N0 and then records the node N0 in the first authentication database DB1.

When the node N1 needs to update the firmware of the other node (in the illustrated instance, the node N0) without any charge, the node N1 requests the server S1 to distribute the session key used in the communication with the node N0 in order to communicate with the node N0 in a secure manner. In other words, the nodes N0 and N1 receive the common session key from the server S1, thereby belonging to the same domain D1. The session key used in the domain D1 is distributed in line with the following procedure.

In this instance, the node N1 acknowledges the necessity of updating the firmware of the node N0 in some way. For example, the node N0 asks the node N1 whether or not the node N1 has the update of the firmware, regularly (e.g., once a month, once a year). Thus, the node N1 can check whether or not updating the firmware of the node N0 is necessary.

Figure 2:
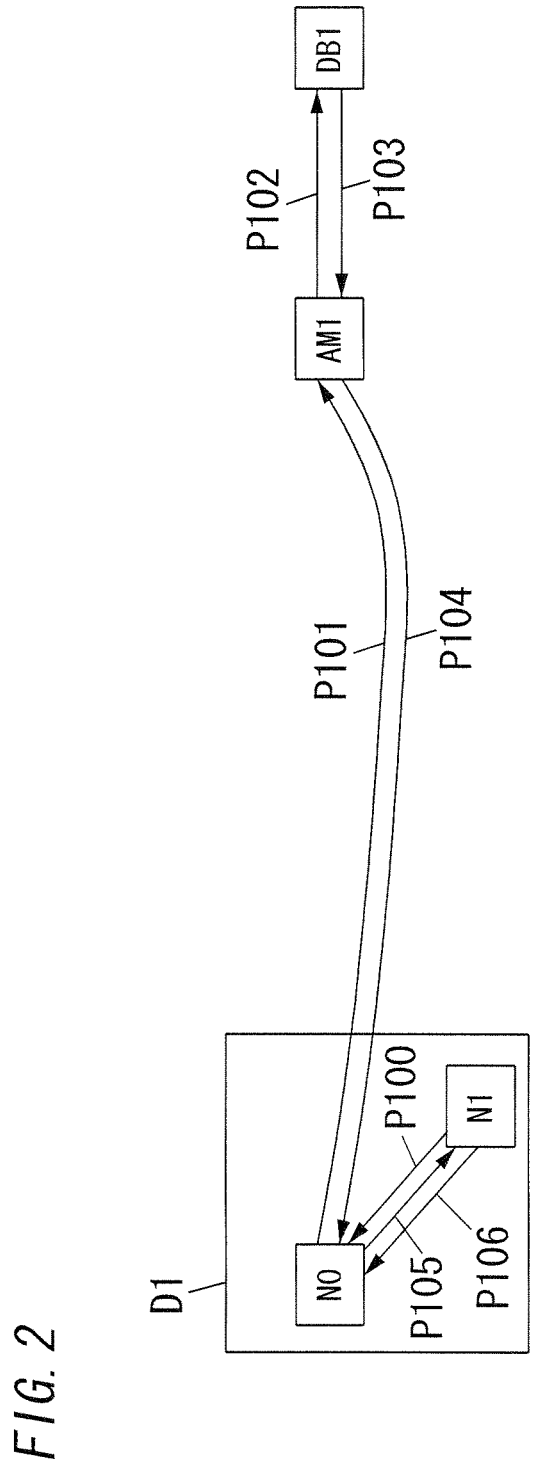
FIG. 2 is a diagram illustrating an operation of a procedure of distributing a session key with regard to the above system.

In order to update the firmware of the node N0, first, the node N1 announces the provision of the service to the node N0 as shown in FIG. 2 (P100). In response to the announcement, the node N0 sends the session key distribution request to the server S1 in order to request the server S1 to distribute the session key (P101). The server S1 receives the session key distribution request from the node N0 via the authenticating means AM1, and then refers to the first authentication database DB1, and thereby obtains the secret key corresponding to the identifier ID0 of the node N0. In brief, the authenticating means AM1 searches the first authentication database DB1 for the secret key by use of the identifier ID0 of the node N0 (P102, P103).

The secret key (first secret key) K0-1 of the node N0 and the secret key (second secret key) K1 of the node N1 are recorded together with the identifiers ID0 and ID1 respectively corresponding to the nodes N0 and N1 belonging to the domain D1 in the first authentication database DB1 preliminarily (e.g., at the time of factory shipment). The authenticating means AM1 uses the secret keys K0-1 and K1 and the identifiers ID0 and ID1, and distributes the session key to the nodes N0 and N1 in accordance with the well known three party key distribution protocol (e.g., KryptoKnight and Kerberos) (P104, P105). In the following explanation, a well known protocol (e.g., KryptoKnight and Kerberos) is used as the three party key distribution protocol, and no explanation thereof is deemed necessary.

In an operation instance as explained below, the secret key (first secret key) K0-1 corresponding to the node N0 and the secret key (second secret key) K1 corresponding to the node N1 are stored in the first authentication database DB1 preliminarily. The two secret keys (first secret keys) K0-21 and K0-22 corresponding to the node N0 and the secret key (second secret key) K2 corresponding to the node N2 are stored in the second authentication database DB2 preliminarily. The secret key (first secret key) K0-3 corresponding to the node N0 and the secret key (second secret key) K3 corresponding to the node N3 are stored in the third authentication database DB3 preliminarily.

Notably, the secret key K0-21 is sent to the node N0 in response to occurrence of an event where the domain D including the node N0 is changed from the domain (lower level domain) D1 to the domain (upper level domain) D2. By contrast, the secret key K0-22 is sent to the node N0 in response to occurrence of an event where the domain D including the node N0 is changed from the domain (upper level domain) D3 to the domain (lower level domain) D2.

As mentioned in the above, when the node N1 requests, via the node N0, the server S1 to distribute the session key, the session key common to the nodes N0 and N1 is distributed to the nodes N0 and N1. Consequently, the node N0 is included in the same domain D1 as the node N1 (the nodes N0 and N1 form a secure group SG1), and thus the nodes N0 and N1 can communicate with each other. In other words, the node N0 is permitted to receive the service (in this instance, the service of updating the firmware) available in the extent of the domain D1.

In the aforementioned three party key distribution protocol, upon receiving the session key for the node N1 from the server S1 (P104), the node N0 sends the session key to the node N1 (P105). The aforementioned three party key distribution protocol may include a procedure (P106) subsequent to the procedure P105. The procedure P106 is defined as a procedure of checking whether or not the nodes N0 and N1 have the same session key. The procedure P106 is optional, and can be omitted.

The following brief explanation is made to the three party key distribution protocol (3PKDP). According to 3PKDP, one of the node as an initiator of communication and the node as a responder of the communication relays data from the other to the authenticating means, thereby communicating with the authenticating means. Therefore, the both nodes can share the session key created by the authenticating means. In 3PKDP, a push scenario or a pull scenario is selected based on which one of the node as the initiator and the node as the responder communicates with the authenticating means.

In the push scenario, the node of the initiator communicates with the node of the responder followed by communicating with the authenticating means, thereby receiving, from the authenticating means, an encryption message for the node of the initiator and an encryption message for the node of the responder. Consequently, the node of the initiator obtains the session key from the encryption message for the node of the initiator, and delivers the encryption message for the node of the responder to the node of the responder. Thus, the node as the responder obtains the session key.

By contrast, in the pull scenario, when the node as the initiator communicates with the node as the responder, the node as the responder communicates with the authenticating means, thereby receiving, from the authenticating means, the encryption message for the node as the initiator and the encryption message for the node as the responder. Consequently, the node as the responder obtains the session key from the encryption message for the node as the responder, and delivers the encryption message for the node as the initiator to the node as the initiator. Thus, the node as the initiator obtains the session key.

In the aforementioned operation instance, the node N1 is the initiator of the communication, and the node N0 is the responder of the communication, and the node N0 request the authenticating means AM1 to distribute the session key. Therefore, the aforementioned operation instance is based on the pull scenario. However, the present embodiment may employ the push scenario where the node N0 acts as the initiator of the communication and communicates with the authenticating means AM1.

Irrespective of protocols (push scenario and pull scenario) to be used, a MAC value is attached to the encryption message including the session key in order to assure the authenticity (the encryption message is not altered). Besides, the encryption message for each node from the authenticating means is encrypted or decrypted with a secret key which is shared by the authenticating means and each node preliminarily. Further, the authenticating means calculates, by use of the secret key, the MAC value from a message including a nonce created by the node, the session key, and the identification information of the node. Thereafter, the authenticating means sends, to the node, the encryption message obtained by encrypting the session key and the MAC value.

Figure 3:
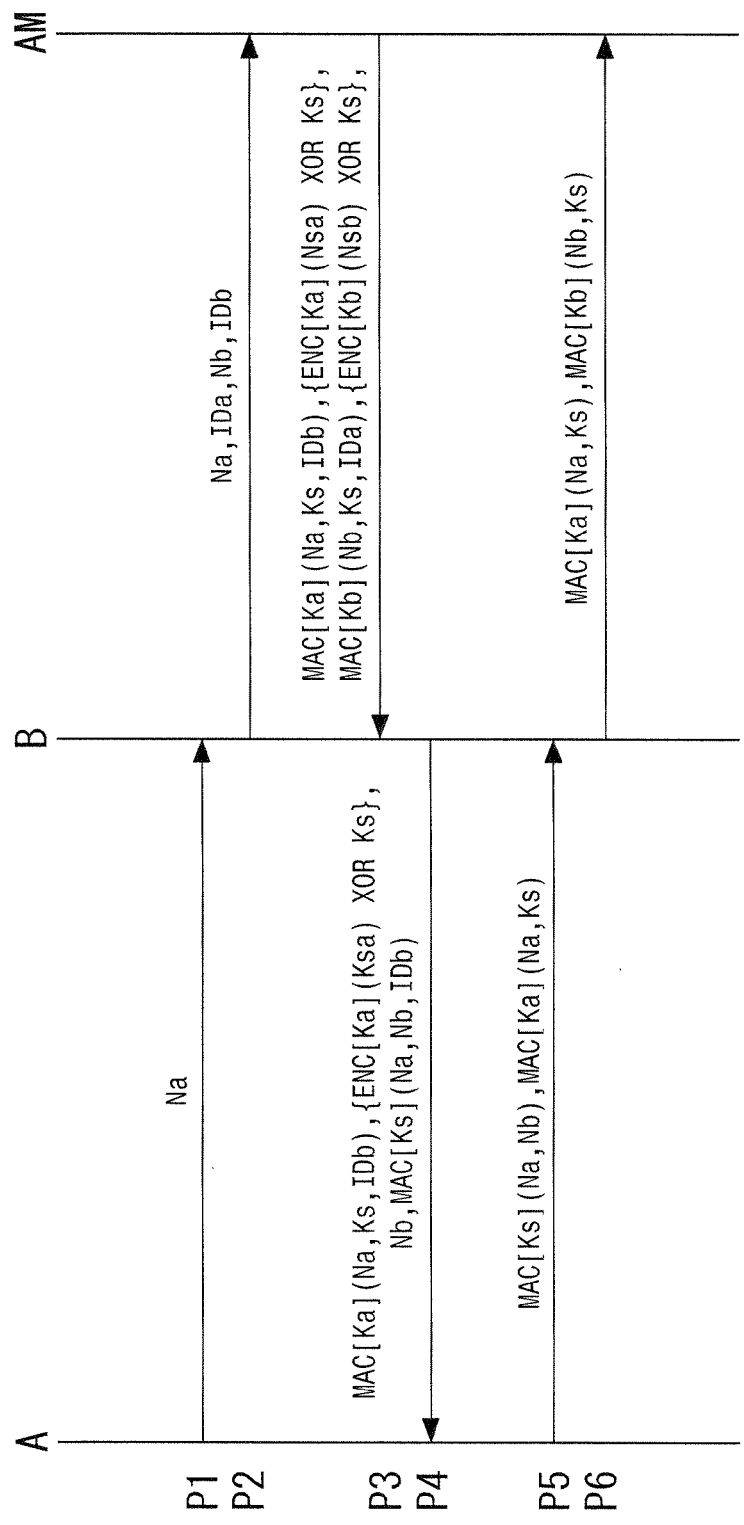
FIG. 3 is a diagram illustrating a 3 party key distribution protocol used in the above system.

FIG. 3 shows an instance of the pull scenario. In the illustrated instance, the node A (in the aforementioned operation instance, the node N1) acts as the initiator, and the node B (in the aforementioned operation instance, the node N0) acts as the responder. The node A preliminarily retain the secret key (common key) Ka (in the aforementioned operation instance, the secret key K1) common to the authenticating means AM and the node A. The node B preliminarily retain the secret key (common key) Kb (in the aforementioned operation instance, the secret key K2) common to the authenticating means AM and the node B.

The node A creates a nonce Na, and sends identification information IDa of the node A together with the created nonce Na (P1). The node B which has received the identification information IDa and the nonce Na from the node A creates a nonce Nb, and sends, to the authentication server AM, the session key distribution request including identification information IDb of the node B and the nonce Nb in addition to the identification information IDa and the nonce Na received from the node A (P2).

Upon receiving the session key distribution request (the identification information IDa and IDb, and the nonces Na and Nb) from the node B, the authenticating means AM (the session key creation module 10) creates the session key. Further, the authenticating means AM (the secret key obtaining module 11) obtains the secret key Ka shared with the node A from the authentication database DB. The authenticating means AM (the encryption module 12) calculates, by use of the secret key Ka common to the node A and the authenticating means AM, the message authentication code value (MAC value) MAC [Ka] (Na, Ks, IDb) from the message including the nonce Na, the session key Ks, and the identification information IDb of the node B. Moreover, the authenticating means (the encryption module 12) uses the calculated MAC value as a nonce Nsa (=MAC [Ka] (Na, Ks, IDb)), and encrypts the nonce Nsa and the session key Ks, thereby creating an encryption message (service encryption message) {ENC [Ka] (Nsa) XOR Ks}.

In addition, the authenticating means AM (the secret key obtaining module 11) obtains the secret key Kb shared with the node B from the authentication database DB. The authenticating means AM (the encryption module 12) calculates, by use of the secret key Kb common to the node B and the authenticating means AM, the message authentication code value (MAC value) MAC [Kb] (Nb, Ks, IDa) from the message including the nonce Nb, the session key Ks, and the identification information IDa of the node A. Moreover, the authenticating means (the encryption module 12) uses the calculated MAC value as a nonce Nsb (=MAC [Kb] (Nb, Ks, IDa)), and encrypts the nonce Nsb and the session key Ks, thereby creating an encryption message (user encryption message) {ENC [Kb] (Nsb) XOR Ks}.

The authenticating means AM (the session key sending module 13) sends, to the node B, the two encryption messages (the user encryption message and the service encryption message) including the session key respectively attached with the corresponding MAC values (P3). Upon receiving the encryption messages from the authenticating means AM, the node B decrypts the encryption message with the secret key Kb, thereby obtaining the nonce Nsb and the session key Ks. The nonce Nsb is identical to the MAC value MAC [Kb] (Nb, Ks, IDa). Therefore, the node B calculates the MAC value by use of the known nonce Nb, the identification information IDa, and the obtained session key Ks. The node B checks whether or not the calculated MAC value is identical to the received MAC value, in order to check the authenticity of the received encryption message.

Thereafter, the node B transfers, to the node A, the encryption message {ENC [Ka] (Nsa) XOR Ks} and the MAC value MAC [Ka] (Na, Ks, IDb) for the node A which are received from the authenticating means AM. Further, the node B calculates the MAC value MAC [Ks] (Na, Nb, IDb) based on the session key Ks, and sends, to the node A, the encryption message and the MAC value for the node A which are received from the authenticating means AM, together with the calculated MAC value and the nonce Nb (P4).

Upon receiving the encryption messages {ENC [Ka] (Nsa) XOR Ks} from the node A, the node B decrypts the received encryption message with the secret key Ka, thereby obtaining the nonce Nsa and the session key Ks. Further, the node A calculates the MAC values MAC [Ka] (Na, Ks, IDb) and MAC [Ks] (Na, Nba, IDb) in a similar manner as the node B. The node A checks whether or not the calculated MAC value is identical to the received MAC value, in order to check the authenticity of the received encryption message.

Thereafter, the node A calculates the MAC value MAC [Ks] (Na, Nb) based on the session key Ks, and sends the same to the node B (P5). Since the node B receives the nonce Na in the procedure P1, the node B can calculate the MAC value MAC [Ks] (Na, Nb) and check whether or not the response has been made by the node A.

Besides, when the authenticating means AM needs to check whether or not the nodes A and B have successfully received the session key Ks, before the procedure P5, the node A may calculate the MAC value MAC [Ka] (Na, Ks) based on the secret key Ka, and send the calculated MAC value together with the MAC value MAC [Ks] (Na, Nb) to the node B. In this arrangement, upon receiving the response from the node A, the node B calculates the MAC value MAC [Kb] (Nb, Ks) based on the secret key Kb, and send, to the authenticating means AM (P6), the calculated MAC value together with the MAC value MAC [Ka] (Na, Ks) received from the node A.

The authenticating means AM can check whether or not the nodes A and B have successfully received the session key Ks, by use of the two MAC values MAC [Ks] (Na, Nb) and MAC [Kb] (Nb, Ks) received from the node B.

2. Example where User is Limited

As described in the above, the node N0 joining in the domain D1 can receive only a requisite minimal service such as a free service of updating firmware. In order to receive a higher level service, the node N0 needs to join the domain D2 including the node N2 so as to receive the service provided by the node N2.

In some case, the service provider charges a fee for a high level service. In a situation where a high level service is available in the domain D2, in order to charge the fee for the high level service to the user of the node N0, the registration of the user using the node N0 is required as an additional condition for including the node N0 in the domain D2.

The node N0 is a device but does not always include an input means used for registering the user. In view of the above, an input device IM installed separately from the node N0 is used for registering the user. For example, the input device IM is a mobile radio telephone or an information terminal (e.g., a personal computer and a PDA). As described in the above, in order to implement a function of registering the user, the server S1 is provided with the registering means RG1 and the user information database storing means DSu. The registering means RG1 is configured to communicate with the input device IM via an information communication network NT2 such as a mobile phone network. The user information database storing means DSu stores the user information database DBu in which a user name is recorded in association with the identifier ID0 of the node N0.

In order to register the user of the node N0 by use of the input device IM, first, the registering means RG1 is accessed by use of the input device IM (P200). Subsequently, the user name and the identifier ID0 of the node N0 are recorded in the user information database DBu through the registering means RG1 (P201, P202).

The account of the user Us of the node Nx is recorded in the form of Us:{IDx} in the user information database DBu. For example, when the user U0 of the node N0 registers its account, the account is recorded in the form of U0:{ID0} in the user information database DBu. Further, the account of the user U0 using the nodes N0 and N2 is expressed in the form of U0 {ID2, ID0}. The explanation to contents of the user information database DBu is mentioned below.

When the account is recorded in the user info, nation database DBu, the recorded account is sent to the input device IM (P203). The input device IM displays the contents recorded in the user information database on a display unit thereof. Therefore, a person operating the input device IM can check the registration information.

If the account of the user U0 of the node N0 has been recorded in the user information database DBu, it is possible to change the domain including the node N0. The change of the domain is performed in response to the request from the node N0 to the key distributing means KD1. That is, the user operates the node N0 in such a manner to request the key distributing means KD1 to change the current domain of the node N0 from the domain D1 to the domain D2. The request (domain change request) of changing the current domain from the domain D1 to the domain D2 includes the identifier ID0 of the node N0 and an identifier of the domain (desired domain) D2 to which the node intends to belong.

For example, when the user U0 of the node N0 knows the existence of the high level service higher than the current service and intends to receive the high level service, the user requests the change of the current domain of the node N0. For example, when the node N0 detects the service, when the node N0 checks the change of the service regularly, or when the node N0 receives the announcement of addition of the new service from the other node, the user is given the opportunity to acknowledge the existence of the high level service.

Figure 4:
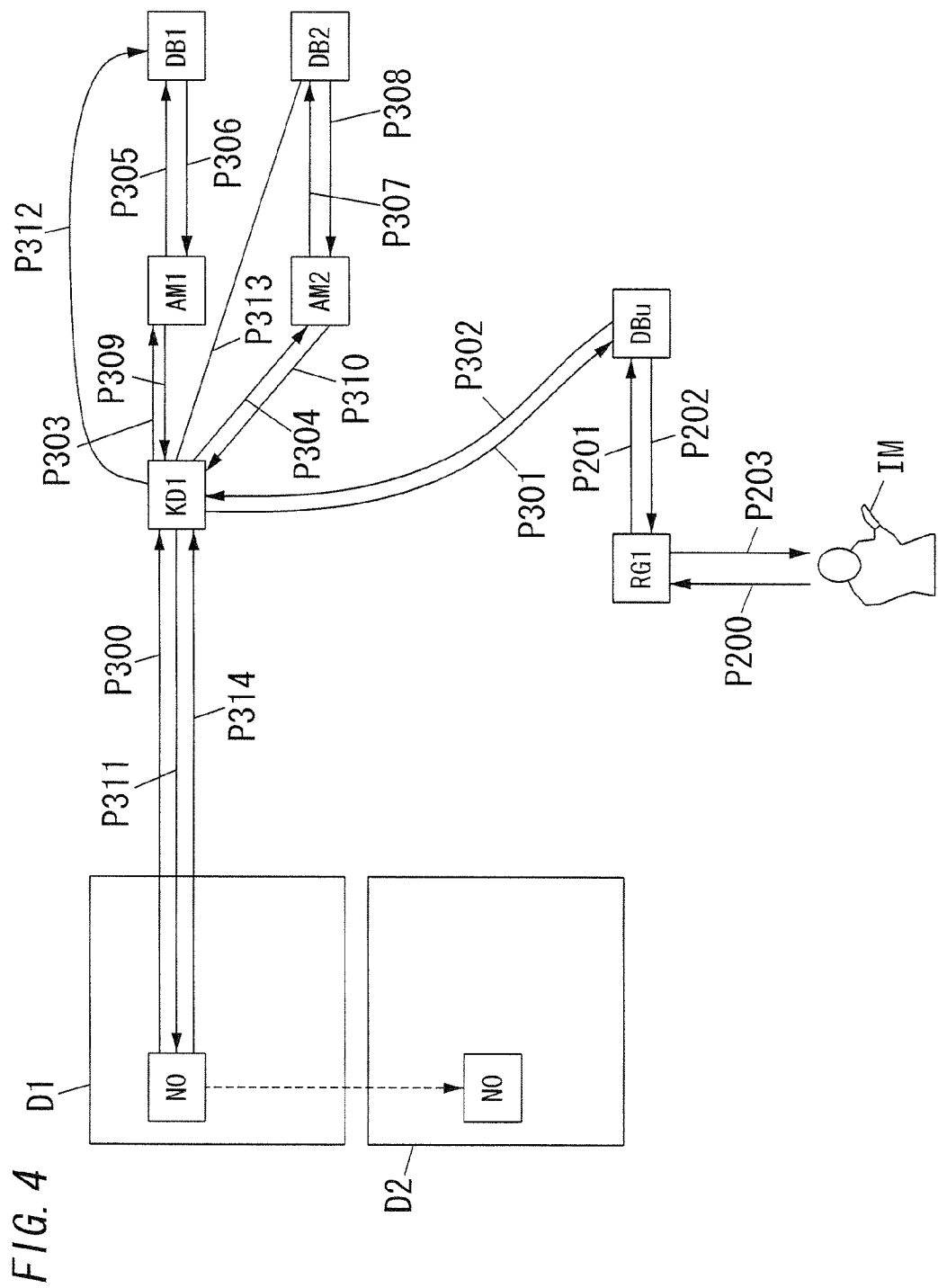
FIG. 4 is a diagram illustrating a procedure of changing a domain in the above system.

For example, the node N0 included in the domain D1 requests the change of the current domain to the domain D2 in line with the procedure illustrated in FIG. 4. First, the node N0 transmits, to the key distributing means KD1, the domain change request indicative of the identifier ID0 of the node N0, the domain (current domain) to which the node N0 belongs currently, and the domain (desired domain) to which the node N0 intends to belong (P300). The key distributing means KD1 has a table respectively associating the domains D1 to D3 with the authenticating means AM1 to AM3, as shown in TABLE 1. The key distribution unit KD1 searches the table illustrated in TABLE 1 on the basis of the current domain D1 and the desired domain D2 included in the domain change request, thereby selecting the authenticating means AM1 and AM2.

TABLE 1

| DOMAIN | AUTHENTICATION SERVER |
|---|---|
| D1 | AM1 |
| D2 | AM2 |
| D3 | AM3 |

Further, upon receiving the domain change request from the node N0, the key distributing means KD1 (the account check module 20) checks whether or not the account of the user U0 has been stored in the user information database DBu (P301, P302). Upon acknowledging that the account of the user U0 has been stored in the user information database, the key distributing means KD1 (the secret key request module 21) sends the identifier ID0 to the authenticating means AM1 selected from the table illustrated in TABLE 1 in accordance with the current domain D1 and the authenticating means AM2 selected from the table illustrated in TABLE 1 in accordance with the desired domain D2 (P303, P304).

Upon receiving the identifier ID0 from the key distributing means KD1, the authenticating means AM1 searches the first authentication database DB1 attached to the authenticating means AM1 on the basis of the identifier ID0. Likewise, upon receiving the identifier ID0 from the key distributing means KD1, the authenticating means AM2 searches the second authentication database DB2 attached to the authenticating means AM2 on the basis of the identifier ID0 (P305 to P308). As a result, the authenticating means AM1 obtains the secret key K0-1. Further, the authenticating means AM2 obtains the secret key K0-21 corresponding to the node N0 and the secret key K2 corresponding to the node N2.

The authenticating means AM1 checks whether or not the node N0 belongs to the domain D1, on the basis of whether or not the secret key corresponding to the node N0 can be obtained from the first authentication database DB1. According to the above instance, the authenticating means AM1 can obtain the secret key K0-1 from the first authentication database DB1. Therefore, the authenticating means AM1 judges that the node N0 belongs to the domain D1. The authenticating means AM1 sends the judgment result to the key distributing means KD1 (P309). Upon verifying that the node N0 belongs to the domain D1, the key distributing means KD1 (the secret key request module 21) obtains, from the authenticating means AM2, the secret key K0-21 of the domain D2 which the authenticating means AM2 has obtained from the second authentication database DB2 (P310). The key distributing means KD1 (the secret key sending module 22) transmits, to the node N0, the secret key K0-21 obtained from the authenticating means AM2 (P311). Upon receiving the secret key K0-21 corresponding to the domain D2, the node N0 deletes the secret key (i.e., the secret key corresponding to the current domain D1) K0-1 which the node N0 has used while belonging to the domain D1, and uses the secret key (the secret key corresponding to the desired domain D2) K0-21 in the subsequent communication. With performing the aforementioned operations, the domain D to which the node N0 belongs is changed from the domain D1 to the domain D2.

After sending the secret key K0-21 to the node N0, the key distributing means KD1 performs a process of deleting an entry (record) of the identifier ID0 of the node N0 and the secret key K0-1 from the first authentication database DB1 (P312), and performs a process of recording an entry of the identifier ID0 of the node N0 and the secret key K0-21 in the second authentication database DB2 (P313). The key distributing means KD1 may perform the process of deleting the entry prior to or subsequent to the process of recording the entry.

The deletion of the entry of the identifier ID0 of the node N0 and the secret key K0-1 from the first authentication database DB1 can be automatically performed in response to the distribution of the secret key K0-21 to the node N0. In this instance, when the distribution of the secret key K0-21 to the node N0 fails, the node N0 has only the secret key K0-1. Since the entry of the secret key K0-1 is already deleted from the first authentication database DB1, the node N0 fails to join the domain D1 even by use of the secret key K0-1. Moreover, since the node N0 does not hold the secret key K0-21, the node N0 fails to join also the domain D2. In brief, the node N0 can join neither the domain D1 nor the domain D2.

In order to avoid the above defect, the node N0 may send, to the key distributing means KD1, an acknowledgement for announcing that the domain of the node N0 is successfully changed from the domain D1 to the domain D2 (i.e., the node N0 successfully receives the secret key K0-21) (P314). With this arrangement, the key distributing means KD1 treats the acknowledgement from the node N0 as a trigger. That is, upon receiving the trigger, the key distributing means KD1 deletes the entry of the identifier ID0 of the node N0 and the secret key K0-21 from the first authentication database DB1. In other words, after acknowledging that the node N0 successfully receives the secret key K0-21, the key distributing means KD1 excludes the node N0 from the domain D1. Consequently, it is possible to assure that the node N0 belongs to either the domain D1 or the domain D2. Besides, the procedure P312 is optional, and is adopted voluntary.

Figure 5:
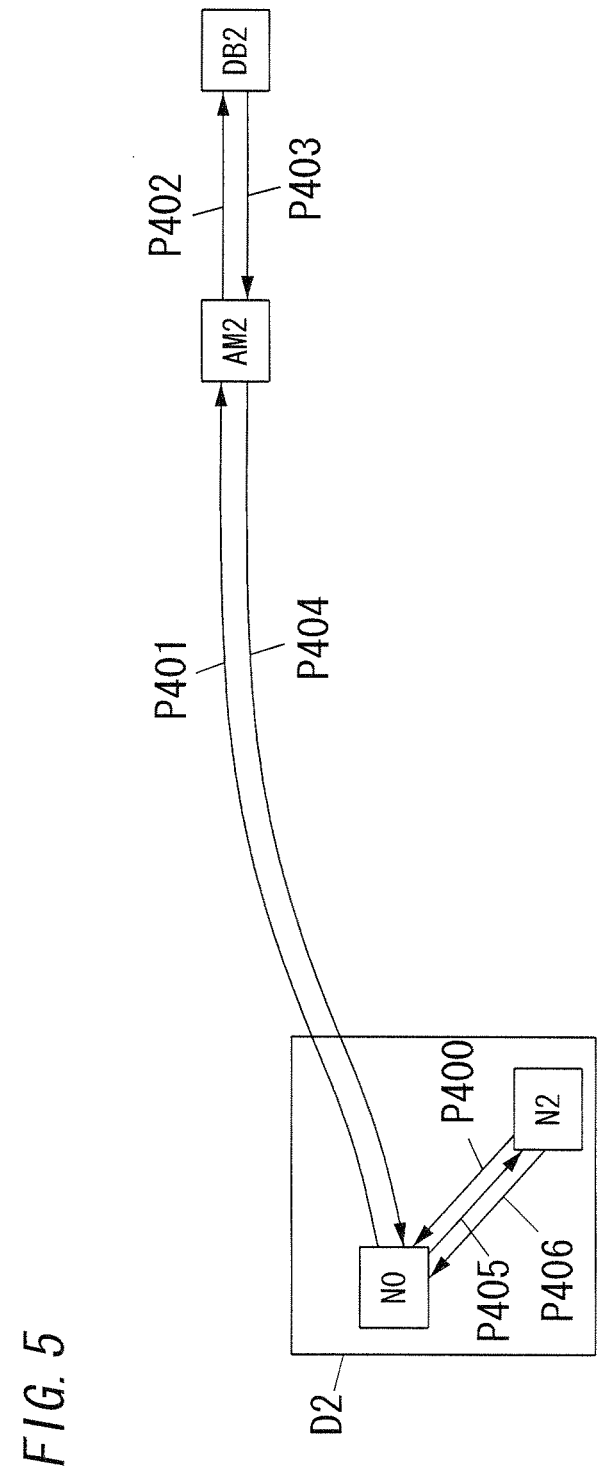
FIG. 5 is a diagram illustrating an operation of a procedure of distributing a session key with regard to the above system.

The node N0 obtains, in accordance with the aforementioned manner, the secret key K0-21 used for joining the domain D2. Thereafter, as shown in FIG. 5, the authenticating means AM2 uses the secret keys K2 and K0-21 to distribute, in line with the known three party key distribution protocol, the session key used by the nodes N0 and N2 in the extent of the domain D2 (this procedure is same as that illustrated in FIG. 2).

When the node N2 decides to provide its service to the node N0, the node N2 announces the provision of the service to the node N0 first (P400). In response, the node N0 requests the authenticating means AM2 of the server S1 to provide the session key (P401). In the server S1, upon receiving the session key distribution request from the node N0, the authenticating means AM2 refers to the second authentication database DB2 and obtains the secret key K0-21 corresponding to the identifier ID0 of the node N0 and the secret key K2 corresponding to the identifier ID2 of the node N2 (P402, P403).

Subsequently, the authenticating means AM2 uses the secret keys K0-21 and K2 and the identifiers ID0 and ID2 to distribute the session key to the nodes N0 and N2 in accordance with the known three party key distribution protocol (P404, P405).

As explained in the above, the node N2 requests, by way of the node N0, the server S1 to distribute the session key. As a result, the session key common to the nodes N0 and N2 is distributed to the nodes N0 and N2. Therefore, the node N0 is entered in the same domain D2 as the node N2, and then the nodes N0 and N2 can communicate with each other. In other words, the node N0 is permitted to receive the service (in this instance, the service of function enhancement) available in the domain D2.

In the aforementioned three party key distribution protocol, when the node N0 receives the session key for the node N2 from the server S1 (P404), the node N0 delivers the received session key to the node N2 (P405). The aforementioned three party key distribution protocol may include an additional procedure (P406) subsequent to the procedure P405. The additional procedure is defined as a procedure of checking whether or not the nodes N0 and N2 hold the same session key. The procedure P406 is optional, and can be omitted.

Besides, in the aforementioned instance, while the node N0 belongs to the domain D2, the node N0 is allowed to hold only one secret key (K0-21). However, while the node N0 belongs to the domain D2, the node N0 may be permitted to retain the secret key K0-1 used in the domain D1 instead of deleting the secret key K0-1. With this arrangement, the node N0 uses, as a default key, the secret key K0-21 used in the domain D2.

In brief, the node N0 may have the two secret keys K0-1 and K0-21. With this arrangement, the node N0 uses the secret key K2 as a default key, thereby belonging to the domain D2. When the node N0 decides to receive the service of the domain D1, the node N0 accesses the authenticating means AM1, and uses the secret key K0-1 to obtain the session key common to the nodes N0 and N1 from the authenticating means AM1. This operation enables the node N0 to access the node N1. Consequently, the node N0 can enjoy the service (e.g., a service of updating the firmware) of the domain D1.

As described in the above, in a situation where the domain D of the node N0 has changed from the low level domain D1 to the high level domain D2, the node N0 may store the two secret keys K0-1 and K0-21 respectively corresponding to the domains D1 and D2. In this instance, the node N0 can use the secret key K0-21 corresponding to the high level domain D2 normally. Further, the node N0 can use the secret key K0-1 corresponding to the low level domain D1 to obtain the session key from the authenticating means AM1, as necessary.

In this instance, the node N0 automatically returns to a condition of using the secret key K0-21 after a lapse of the available period of the session key from the time at which the node N0 terminates receiving the service in the domain D1. Alternatively, the node N0 returns to the condition of using the secret key K0-21 in response to predetermined manipulation given to the node N0. In brief, the node N0 belongs to the domain D1 temporarily.

In the above instance, the node N0 normally belongs to the high level domain D2 but temporarily changes the current domain from the high level domain D2 to the low level domain D1. Alternatively, the node N0 may belong to the high level domain D2 and the low level domain D1 simultaneously. In brief, the node N0 may be allowed to use the domains D1 and D2 simultaneously without selecting one of them.

3. Example of Forming Group

While the node N0 belongs to the domain D1 or D2, the node N0 receives a service solely. The following explanation is made to an instance where a group registration regarding the node N0 is enabled when the node N0 joins the higher level domain D3. The group registration regarding the node N0 permits the node N0 to cooperate with the other node included in the same group as the node N0, for example.

Like a situation where the node N0 receives the service in the domain D2, the node N0 cannot receive the service in the domain D3 unless the account of the user U0 is stored in the user information database DBu (see the procedures P200 to P203 in FIG. 4). When the node N0 belongs to the domain D2 before belonging to the domain D3, the account of the user U0 is already stored in the user information database DBu. Therefore, it is possible to use the account of the user U0. However, it is necessary to perform the group entry in the domain D3. Therefore, the account needs to include information regarding a node forming a group together with the node N0, in addition to the user name and the identifier ID0 of the node N0.

In the following explanation, the node N3 is defined as a node forming a group together with the node N0. In the procedure of adding the account to the user information database, the group registration regarding the identifier ID0 of the node N0 and the identifier ID3 of the node N3 is performed in addition to the registration of the user name and the identifier ID0 of the node N0. Like the situation where the node N0 receives the service of the domain D2, the input device IM is used for adding the account of the user U0 to the user information database DBu.

With regard to the account of the user Us using the node Nx in the user information database DBu, the node Nx is added to the group Gy as follows. That is, in order to associate the node Nx with the user Us, the account is registered in the form of Us:{IDx}. Further, in order to add the node Nx to the group Gy, the group is registered in the form of Gy:{IDx}. The identifier IDx of the node Nx means the identifiers of all the nodes associated with the user Us and/or the group Gy.

When the user is associated with, in addition to the node N3 included in the domain D3, the node N2 included in the domain D2 subordinate to the domain D3, the account indicative of U0:{ID2, ID3, ID0} is registered as the account of the user U0 of the node N0. It is assumed that a group which the user U0 intends to register is identified by G1. When only the node N3 of the domain D3 is associated with the node N0 with regard to the group G1, the group indicative of G1:{ID3, ID0} is registered.

It is assumed that the user information database DBu stores the account of the user U0 of the node N0 which indicates that the user U0 is associated with the three nodes N0, N2, and N3 and that the two nodes N0 and N3 are included in the group G1. In other words, it is assumed that the user information database DBu retains the account of the user U0 which includes the identifiers ID0 and ID3 of the nodes N0 and N3 to be joined in the group G1.

Figure 6:
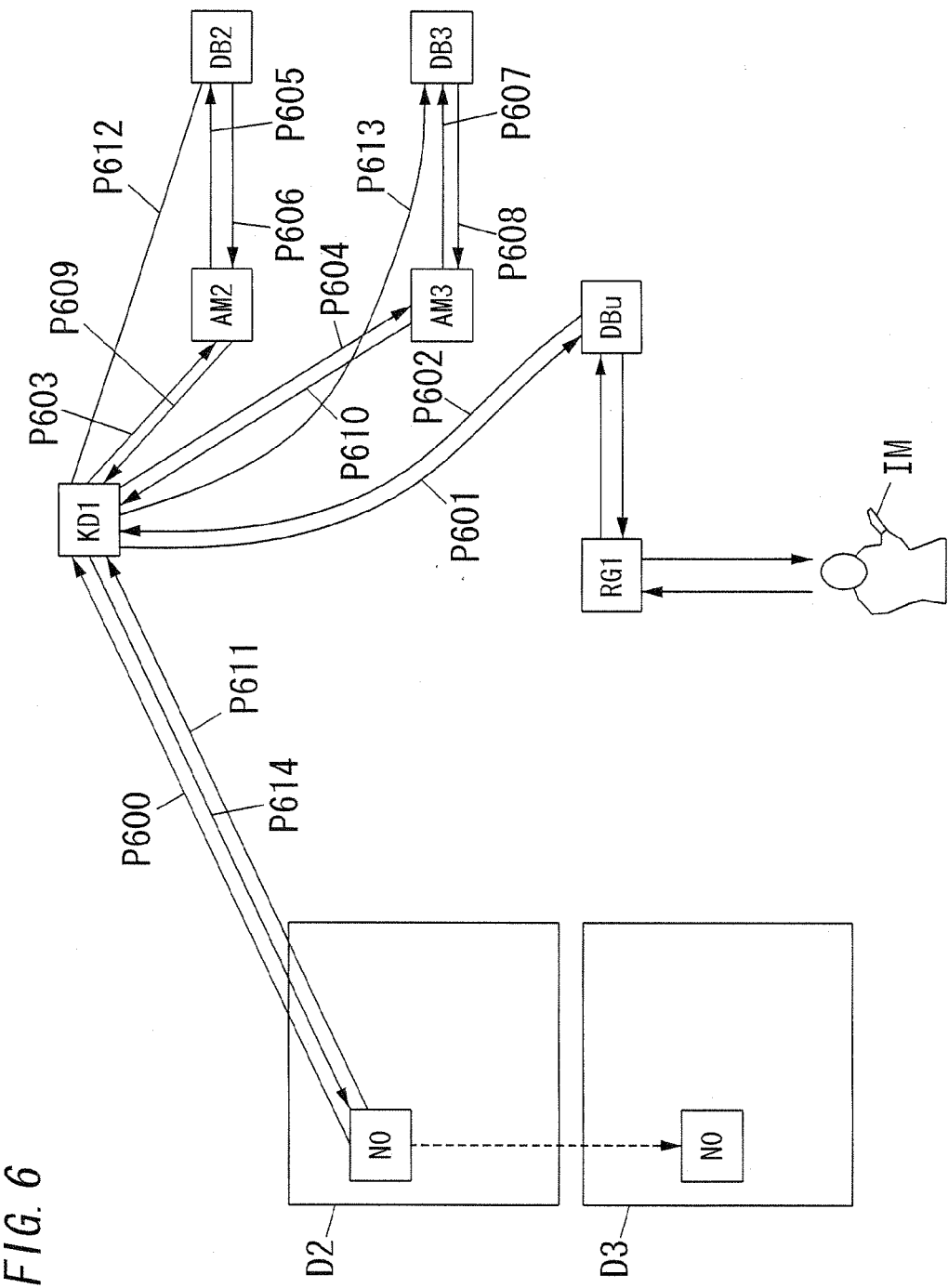
FIG. 6 is a diagram illustrating a procedure of changing a domain in the above system.
Figure 7:
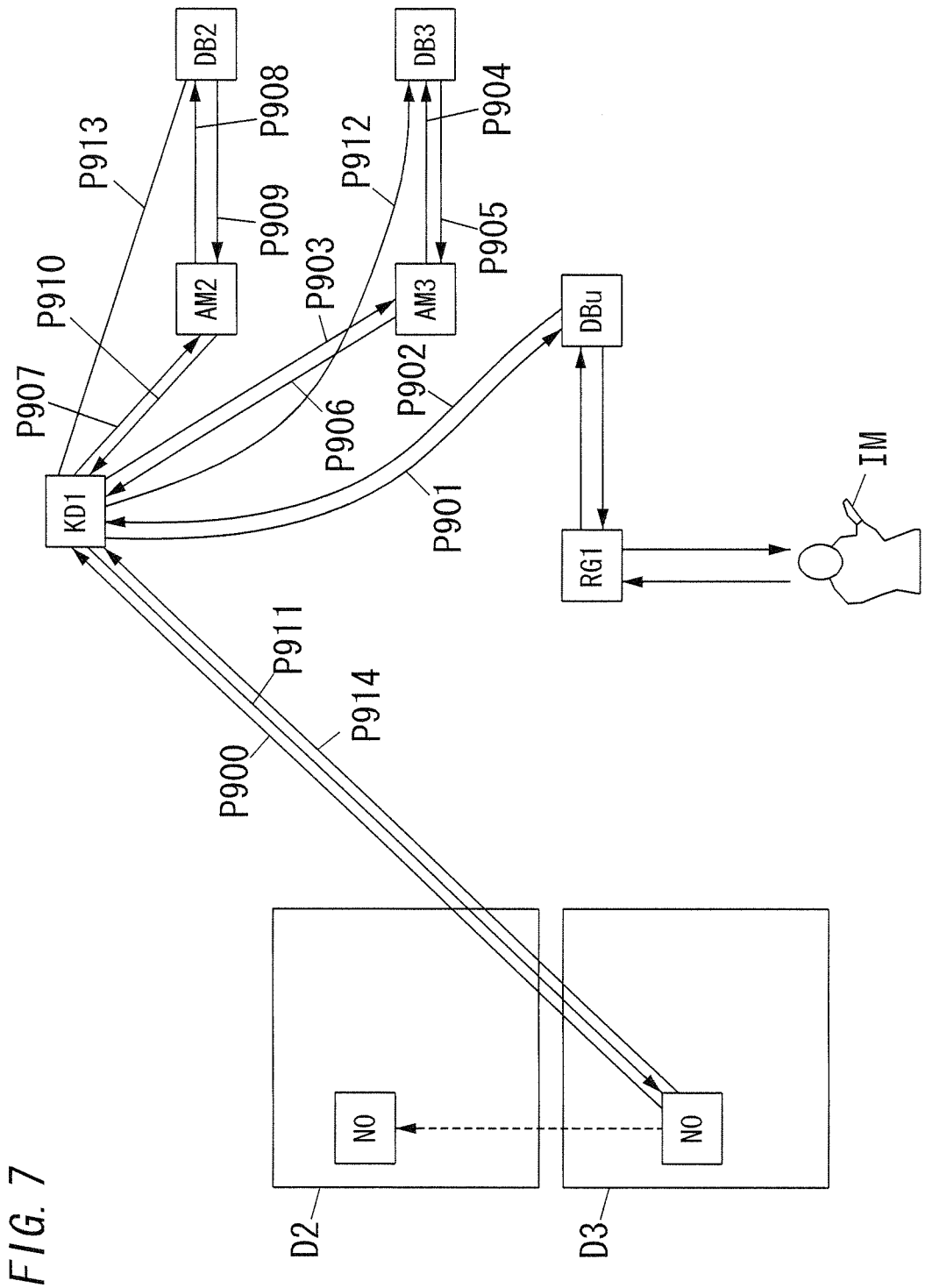
FIG. 7 is a diagram illustrating a procedure of changing a domain in the above system.

As shown in FIG. 6, when the user operates the node N0 such that the domain D of the node N0 is changed from the domain D2 to the domain D3, the node N0 transmits, to the key distributing means KD1, the domain change request including the identifier ID0 of the node N0, the current domain D2, and the desired domain D3 (P600). A motivation of changing the domain of the node N0 is given to the user at timing similar to the timing at which the motivation of changing the domain of the node N0 from the domain D1 to the domain D2 is given to the user.

The domain change request sent from the node N0 to the key distributing means KD1 indicates the current domain D2 and the desired domain D3. Therefore, upon receiving the domain change request, the key distributing means KD1 refers to the table as illustrated in TABLE 1, and selects the authenticating means AM2 and AM3 respectively corresponding to the current domain D2 and the desired domain D3.

The node N0 needs the change of the secret key used by the node N0 in order to belong to the domain D3. In brief, while the node N0 belongs to the domain D2, the node N0 uses the secret key K0-21. By contrast, while the node N0 belongs to the domain D3, the node N0 needs to use the secret key K0-3. The procedures P300 to P311 performed for changing the domain D of the node N0 from the domain D1 to the domain D2 can be applied to procedures for replacing the current secret key K0-21 with the new secret key K0-3. In this application, the authenticating means AM1, the authenticating means AM2, the authentication database DB1, and the authentication database DB2 are replaced by the authenticating means AM2, the authenticating means AM3, the authentication database DB2, and the authentication database DB3, respectively.

The following brief explanation is made to procedures for changing the domain D of the node N0 from the domain D2 to the domain D1. As described in the above, the key distributing means KD1 selects the authenticating means AM2 and AM3 in response to reception of the domain change request from the node N0. Further, the key distributing means KD1 checks whether or not the user information database DBu has the account of the user U0 of the node N0 (P601, P602). Upon acknowledging that the user information database DBu retains the account of the user U0, the key distributing means KD1 sends the identifier ID0 of the node N0 to the authenticating means AM2 and AM3 (P603, P604). The authenticating means AM2 checks whether or not the second authentication database DB2 holds the secret key corresponding to the identifier ID0. Further, the authenticating means AM3 checks whether or not the third authentication database DB3 stores the secret key corresponding to the identifier ID0 (P605 to P608).

As a result, the authenticating means AM2 obtains the secret key K0-21 to be used by the node N0 in the domain D2. Moreover, the authenticating means AM3 obtains the secret key K0-3 to be used by the node N0 in the domain D3.

The authenticating means AM2 and AM3 send the secret keys K0-21 and K0-3 to the key distributing means KD1, respectively (P609, P610). The key distributing means KD1 encrypts the secret key K0-3 with the secret key K0-21 and sends the encrypted secret key K0-3 to the node N0 (P611). Upon receiving the secret key K0-3, the node N0 deletes the secret key (i.e., the secret key corresponding to the current domain D2) K0-21 which the node N0 has used while belonging to the domain D2. The node N0 uses the secret key (the secret key corresponding to the desired domain D3) K0-3 in subsequent communication. Thus, the domain D to which the node N0 belongs is changed from the domain D2 to the domain D3.

After sending the secret key K0-3 to the node N0, the key distributing means KD1 performs a process of deleting an entry of the identifier ID0 of the node N0 and the secret key K0-21 from the second authentication database DB2 (P612), and performs a process of recording an entry of the identifier ID0 of the node N0 and the secret key K0-3 in the third authentication database DB3 (P613). Like the change of the domain D2 from the domain D1, the key distributing means KD1 may perform the process of deleting the entry prior to or subsequent to the process of recording the entry.

Alternatively, the entry of the identifier ID0 of the node N0 and the secret key K0-21 may be deleted from the second authentication database DB2 automatically in response to distribution of the secret key K0-3 to the node N0. Even when the distribution of the secret key K0-3 to the node N0 fails and the node N0 retains no secret key K0-3, the entry of the secret key K0-21 is deleted from the second authentication database DB2. Therefore, the node N0 can join neither the domain D2 nor the domain D3.

The node N0 may perform an optional procedure (P614) of sending an acknowledgement to the key distributing means KD1 in response to reception of the secret key K0-3. The key distributing means KD1 may perform an optional procedure of deleting the entry of the identifier ID0 of the node N0 and the secret key K0-21 from the authentication database DB2 in response to reception of the acknowledgement from the node N0.

After the node N0 obtains the secret key K0-3 necessary for belonging to the domain D3, the authenticating means AM3 distributes the session key to the nodes N0 and N3 included in the domain D3 by use of the secret keys K0-3 and K3 in line with the known three party key distribution protocol in response to a request of communication between the nodes N0 and N3 in the domain D3. The procedures of distributing the session key are similar to the procedures P100 to P106 illustrated in FIG. 2 or the procedures P400 to P406 illustrated in FIG. 5, and therefore no explanation thereof is deemed necessary.

The session key is distributed to the nodes N0 and N3 included in the domain D3. Thereby, the node N0 forms a group together with the node N3. Thus, the cooperation of the nodes N0 and N3 is enabled. The cooperation is explained below.

Besides, in the aforementioned instance, while the node N0 belongs to the domain D3, the node N0 is allowed to hold only one secret key K0-3. However, the secret key K0-21 need not be deleted. In brief, the node N0 belonging to the domain D3 may have the secret keys K0-3 and the K0-21. With this arrangement, the node N0 uses, as a default key, the secret key K0-3.

In the above arrangement, the key distributing means KD1 is configured not to delete the entry of the identifier ID0 of the node N0 and the secret key K0-21 from the second authentication database DB2 in response to the distribution of the secret key K0-3 to the node N0. Further, the node N0 is configured not to delete the previous secret key K0-21.

The node N0 uses the secret key K0-3 as its default key. Therefore, the node N0 belongs to the domain D3 in an initial setting. When the node N0 decides to receive the service of the domain D2, the node N0 accesses the authenticating means AM2, and uses the secret key K0-21 in the domain D2 to obtain the session key same as the node N2 from the authenticating means AM2. This operation enables the node N0 to access the node N2. Consequently, the node N0 can enjoy the service available in the domain D2.

The above instance explains how to receive the service in the domain D2. However, the above instance can be applied to a situation where the domain is changed from the domain D1 to the domain D2. In brief, if the node N0 stores the three different types of the secret keys K0-1, K0-21 and K0-3, the node N0 can receive the service in the domain D1 in addition to the service in the domain D2.

Preferably, the node N0 holding the different types of the secret keys automatically returns to a condition of using the secret key K0-3 after a lapse of the available period of the session key from the time at which the node N0 terminates receiving the service in the domain other than the domain D3. Alternatively, the node N0 returns to the condition of using the secret key K0-3 in response to predetermined manipulation given to the node N0.

Besides, the operation of changing the domain including the node N0 may be omitted. In other words, the node N0 may belong to the plural domains simultaneously. That is, the node N0 may be enabled to receive the services in the low level domains D1 and D2 even when the node N0 is permitted to receive the service in the high level domain D3.

The aforementioned operation instance indicates a situation of changing the domain D of the node N0 from the domain D1 to the domain D2, and a situation of changing the domain D of the node N0 from the domain D2 to the domain D3. However, the domain D of the node N0 can be changed from the domain D1 to the domain D3 by means of the similar procedures.

The following brief explanation is made to procedures for changing the domain D of the node N0 from the domain D1 to the domain D3. In order to enable the node N0 to belong to the domain D3, it is necessary to preliminarily add the user's account and the group to the user information database DBu by use of the registering means RG1. Subsequently, the node N0 sends, to the key distributing means KD1, the domain change request from the domain D1 to the domain D3. Upon receiving the domain change request, the key distributing means KD1 selects the authenticating means AM1 and AM3 based on the received domain change request. The key distributing means KD1 sends the secret key K0-3 to the node N0 by use of the secret key K0-1 recorded in the first authentication database DB1 and the secret key K0-3 recorded in the third authentication database DB3. Thus, the secret key retained by the node N0 is changed from the secret key K0-1 to the secret key K0-3.

Besides, when the node N0 belongs to the domain D1 (or D2), the node N0 can share the session key with all the nodes N1 (or N2) included in the domain D1 (or D2) and therefore communicate with them in a secure manner. However, when the node N0 belongs to the domain D3, the node N0 is permitted to share the session key with only the node N3 which forms the group G1 with the node N0. Therefore, the node N0 can communicate with only such a node N3 in a secure manner.

4. Example of Changing to Low Level Domain

The following brief explanation is made to procedures for changing the domain of the node N0 from the high level domain to the low level domain. A service of each of the domains D1 to D3 is exemplified once more. That is, in the above instance, the node N0 can receive a basic service (e.g., a service of updating the firmware) in the domain D1 with no charge. The node N0 can receive a paid service in the domain D2. With regard to the domain D3, the node N0 can form a group together with the other node included in the same domain, and therefore the cooperation of plural nodes is enabled.

Consequently, when the domain D of the node N0 is changed from the high level domain D3 to the low level domain D2, the node N0 is prohibited to cooperate with the associated node. When the domain D of the node N0 is changed from the high level domain D2 to the low level domain. D1, the node N0 fails to receive the paid service. Besides, it is possible to change the domain D of the node N0 from the domain D3 to the domain D1 directly.

The following explanation is made to a situation where the domain D of the node N0 is changed from the domain D3 to the domain D2. The following procedures can be applied to both a situation where the domain D of the node N0 is changed from the domain D2 to the domain D1 and a situation where the domain D of the node N0 is changed from the domain D3 to the domain D1.

In order to change the domain D of the node N0 from the domain D3 to the domain D2, the identifier ID0 of the node N0 is removed from the account U0:{ID2, ID3, ID0} of the user U0 in the user information database DBu. Instead, the user information database DBu needs to store the account U0:{ID2, ID0} corresponding to the domain D2. Alternatively, the identifier ID3 of the node N3 included in the domain D3 may be deleted from the aforementioned account U0:{ID2, ID3, ID0}. Further, in order to alter the group registration, the identifier ID0 of the node N0 is removed from the registration contents G1:{ID3, ID0} of the group G1 in the user information database DBu.

The modification of the user's account and the group in the user information database DBu is performed in a similar manner as the registration of the user's account and the group in the user information database DBu. For example, a user accesses the registering means RG1 by use of the input device IM, thereby deleting the account and the group (group registration) of the node N0 regarding the domain D3 from the user information database DBu via the registering means RG1 and the input device IM.

The modification of the user information database DBu is announced to the input device IM via the registering means RG1. Therefore, the modification of the user information database DBu can be confirmed by use of the display unit provided to the input device IM. Although these procedures relate to the deletion and the procedures P200 to P203 relate to the registration, these procedures are substantially same as the procedures P200 to P203 illustrated in FIG. 4.

According to the aforementioned instance, in a condition where the node N0 belongs to the domain D3, the account of the user U0 of the node N0 indicates U0:{ID2, ID3, ID0} and the content of the group registration indicates G1:{ID3, ID0}. After the account and the group of the node N0 regarding the domain D3 are deleted from the user information database DBu, the account indicates U0:{ID2, ID0} and the content of the group registration indicates G1:{ID3}.

Subsequently, manipulation of changing the domain D of the node N0 to the domain D2 from the domain D3 is performed. In response, the node N0 accesses the key distributing means KD1 in a similar manner as changing the domain D of the node N0 to the high level domain from the low level domain (P900). The key distributing means KD1 checks the account in the user information database DBu (P901 and P902). In other words, the key distributing means KIM confirms that the node N0 requests the reception of the service in the domain D2, with reference to the user information database DBu.

Thereafter, the key distributing means KD1 refers to the table illustrated in TABLE 1, and selects the authenticating means AM3 corresponding to the current domain D3 and the authenticating means AM2 corresponding to the desired domain D2. The key distributing means KD1 requests the selected authenticating means AM3 to check whether or not the authentication database DB3 stores the secret key K0-3 corresponding to the current domain D3. Thus, the key distributing means KD1 confirms that the authentication database DB3 stores the secret key K0-3 (P903 to P906).

Subsequently, the key distributing means KD1 accesses the authentication database DB2 via the authenticating means AM2, and picks up the secret key K0-22 corresponding to the node N0 from the second authentication database DB2 (P907 to P910).

Upon receiving the secret key K0-22, the key distributing means KD1 sends the secret key K0-22 to the node N0 (P911). Further, the key distributing means KD1 deletes an entry of the identifier ID0 of the node N0 and the secret key K0-3 from the authentication database DB3. Therefore, the node N0 is prohibited to receive the service available the domain D3.

Like a situation where the domain D of the node N0 is changed to the high level domain, the entry of the identifier ID0 of the node N0 and the secret key K0-3 may be deleted from the authentication database DB3 at appropriate timing after the key distributing means KD1 sends the secret key K0-22 to the node N0. However, when the procedure (P912) where the node N0 sends an acknowledgement in response to receiving the secret key K0-22 is adopted, the key distributing means KD1 is preferred to delete the entry of the identifier ID0 of the node N0 and the secret key K0-3 from the authentication database DB3 in response to the reception of the acknowledgement from the node N0. Besides, the procedure P912 is optional.

The node N0 acquires the secret key K0-22 in the aforementioned manner. Thereafter, the authenticating means AM2 distributes the session key dedicated to the domain D2 to the nodes N0 and N2 by use of the secret keys K0-22 and K2 in line with the known three party key distribution protocol. The procedures of distributing the session key are similar to the procedures P100 to P106 illustrated in FIG. 2 or the procedures P400 to P406 illustrated in FIG. 5, and therefore no explanation thereof is deemed necessary.

When the domain D including the node N0 is changed from the lower domain D1 to the upper domain D2, the node N0 may be permitted to receive the service available in the lower domain D1 in addition to the service available in the upper domain D2. However, when the domain D to which the node N0 belongs is changed from the upper domain D3 to the lower domain D2, the node N0 is no longer permitted to receive the service available in the upper domain D3.

The aforementioned operation instance indicates the process of changing the domain D of the node N0 from the domain D3 to the domain D2. However, this process can be applied mutatis mutandis to a situation of changing the domain from the domain D2 to the domain D1 and a situation of changing the domain from the domain D3 to the domain D1.

According to the account of the user Us recorded in the user information database DBu, the identifier IDx of the node Nx is associated with the user Us, as described in the above. Further, according to the registered group regarding the account of the user Us recorded in the user information database DBu, the node N is associated with the registered group.

In the process of adding the account of the user Us to the user information database DBu, the identifier IDx of the node Nx is connected to the user Us or is disconnected from the user Us by the registering means RG1 irrespective of whether or not the group registration is performed. In the process of registering the group, the identifier IDx of the node Nx is added to the group or is removed from the group by the registering means RG1. Besides, after the account is deleted from the user information database DBu, the deleted account is treated as an unregistered account.

As described in the above, the domain of the node is not changed simply when the user of the node adds its account to the user information database DBu. That is, the domain D of the node N0 is changed when the authenticating means AM transmits the session key used in the corresponding domain D to the node N0 under a control of the key distributing means KD1 as a proxy service.

The following TABLE 2 indicates an example of the contents of the user information database DBu. In TABLE 2, the value of the status indicates a condition of the account. For example, value "0" indicates an unregistered account, value "1" indicates a registered account, and value "2" indicates a deleted account.

TABLE 2

| account | group (group name) | node (identifier) | status |
|---------|--------------------|--------------------|--------|
| U1 | G1 | N1, N2 . . . , Nk-1 (ID1, . . . , IDk-1) | 1 |
|  |  | Nk, . . . , Nq-1 (IDk, . . . , IDq-1) | 0 |
|  | none | Nq, . . . , Nn (IDq, . . . , IDn) | 0 |

5. Priority of Changed Domain

For example, when the setting of the node N0 is modified, an event where the node N0 fails to obtain the session key used in the current domain D from the authenticating means AM is likely to occur. The following explanation is made to an operation of changing the domain D of the node N0 in response to occurrence of the above event.

As described in the above, the authentication system includes the domains D1 to D3 constituting the layered architecture. The domain D3 is defined as a domain superior to the domain D2. The domain D2 is defined as a domain superior to the domain D1. In addition, as shown in TABLE 3, a rule indicative of an order (priority) of changing the domain D to which the node N0 belongs is prepared for each domain D.

TABLE 3

| domain | rule |
|---|---|
| D1 | D1→D2 |
|  | D1→D3 |
| D2 | D2→D3 |
|  | D2→D1 |
| D3 | D3→D2 |
|  | D3→D1 |

With reference to TABLE 3, when the node N0 joining the domain D3 is no longer able to obtain the session key corresponding to the domain D3 from the authenticating means AM3, the node N0 attempts to change its own domain D from the domain D3 to the domain D2 first. In brief, the node N0 tries to access the authenticating means AM2 to obtain the session key corresponding to the domain D2. When the node N0 fails to receive the session key from the authenticating means AM2, the node N0 intends to change its own domain D from the domain D3 to the domain D1. In brief, the node N0 attempts to access the authenticating means AM1 to acquire the session key corresponding to the domain D1.

Likewise, when the node N0 belonging to the domain D2 can no longer obtain the session key corresponding to the domain D2 from the authenticating means AM2, the node N0 tries to change its own domain D from the domain D2 to the domain D3. In other words, the node N0 seeks to access the authenticating means AM3 to obtain the session key corresponding to the domain D3. When the node N0 fails to receive the session key from the authenticating means AM3, the node N0 tries to change its own domain D from the domain D2 to the domain D1. That is, the node N0 intends to access the authenticating means AM1 to obtain the session key corresponding to the domain D1.

Further, when the node N0 joining the domain D1 is no longer able to acquire the session key corresponding to the domain D1 from the authenticating means AM1, the node N0 first tries to change its own domain D from the domain D1 to the domain D2. In other words, the node N0 attempts to access the authenticating means AM2 to obtain the session key corresponding to the domain D2. When the node N0 cannot receive the session key from the authenticating means AM2, the node N0 intends to change its own domain D from the domain D1 to the domain D3. That is, the node N0 tries to access the authenticating means AM3 to obtain the session key corresponding to the domain D3.

In the present operation instance, the three domains D1 to D3 are employed. The fact that the node N0 fails to obtain the session key as a result of trying to obtain the session key from the other two domains would indicate that the node N0 can no longer obtain the session key from any authenticating means AM1 to AM3. In this case, the node N0 is reset to its initial state and then is newly added to the information communication network NT.

As described in the above, upon acknowledging that the node N0 can no longer obtain the session key of the authenticating means AM of its own domain D, the node N0 tries to access the other domain D in accordance with the rule 3 shown in TABLE 3 in order to acquire the other session key. The order of the authenticating means AM which the node N0 accesses to try to obtain the session key is preliminarily determined with regard to each domain which has a probability of including the node N0. The node N0 tries to access the authenticating means AM in line with this predetermined order. In the rule shown in TABLE 3, the priority order of the domains D is determined such that the domain D of the node N0 is changed to the domain D which is superior to the current domain D.

6. Example of Access Control Performed for Each Service

In the above operation instance, each of the node Ns (N1 to N3) is configured to provide a single service. By contrast, each of the node Ns (N1 to N3) may be configured to provide multiple services. In this arrangement, each node Ns may be configured to determine for each service whether or not it provides its service to the node N0. For example, when payment is necessary for enjoying a service in the domain D2, the service is prepared with regard to each of different fees.

In the following explanation, the identifier of the node Ni is expressed as IDi. Further, the identifier Bj is allocated to the service which the node Ni provides or receives. Moreover, in the following explanation, the term "service Bj" means the service specified by the identifier Bj.

The condition where the node Ni is enabled to provide the service Bj is indicated by the access restriction (Ni provide Bj). The node Ni can perform three types of process (a reading process, a writing process, and an executing process) as a process of receiving the service Bj. The condition where the node Ni is enabled to perform the reading process, the writing process, and the executing process with regard to the service Bj is indicated by the access restriction (Ni read/write/exec Bj). The above information (access restriction) with regard to each node Ni is preliminarily recorded in the authenticating means AM by use of the input device IM or the like. When the authenticating means AM gives the session key to each node Ni, the above information is provided to a corresponding node Ni.

In each operation instance as described in the above, the accessible extent of the node Ni is included in the extent of the domain, and the access restriction is performed for each node. By contrast, with dividing the information regarding the service Bj at each node Ni into provision information and reception information, the access restriction can be performed for each operation included in the service Bj. Therefore, the plural services Bj are executable at each node Ni, and the access restriction is performed for each service Bj.

For instance, the node N0 receives the service B1 (the service of updating the firmware) provided by the node N1 in the domain D1. In this instance, the access restriction (N0 read B1) and the access restriction (N1 provide B1) are recorded in the authenticating means AM1 (the authentication database DB1).

For instance, the node N0 receives the paid service B2 provided by the node N2 in the domain D2, and the service B2 includes the reading process and the writing process. In this instance, the authenticating means AM2 stores the access restriction (N0 read/write B2) and the access restriction (N2 provide B2). For instance, the node N0 receives the paid service B2' provided by the node N2 in the domain D2, the service B2' includes only the reading process (such as the firmware updating service). In this instance, the authenticating means AM2 retains the access restriction (N0 read B2') and the access restriction (N2 provide B2').

In order to enable the cooperation between the nodes N0 and N3 in the domain D3, the access restriction with regard to the service B3 provided by the node N3 needs to include the executing process in addition to the reading process and the writing process. Therefore, the access restriction (N0 read/wirte/exec B3) and the access restriction (N3 provide B3) are recorded in the authenticating means AM3.

The aforementioned relations are illustrated in TABLE 4 and TABLE 5. The access restrictions indicated in TABLE 4 are recorded in the authenticating means AM. The access restriction recorded in the authenticating means AM is provided to a corresponding node at the time of distributing the session key to the nodes N belonging to the domain D corresponding to the authenticating means AM. TABLE 5 shows an explanation of each service Bj.

TABLE 4

| domain | outline of service | access restriction |
|---|---|---|
| D1 | firmware update | N0 read B1 |
|  |  | N1 provide B1 |
| D2 | accounting service between registered devices | N0 read/write B2 |
|  |  | N2 provide B2 |
| D2 | firmware update | N0 read B2' |
|  |  | N2 provide B2' |
| D3 | cooperation service in registered group | N0 read/write/exec B3 |
|  |  | N3 provide B3 |

TABLE 5

| service | outline of service | detail of service |
|---|---|---|
| B1 | firmware update | updating the firmware for no fee |
| B2 | accounting service between registered devices | providing the service for a fee |
| B2' | firmware update | updating the firmware for a fee (adding new functions) |
| B3 | cooperation service in registered group | enabling the cooperation between the nodes designated by the user |

In the present operation instance, the node N0 belonging to the domain D shares the session key with the node N included in the domain D, thereby receiving the service from the node N in the domain D. Additionally, the present operation instance adopts the services B1, B2, B2', and B3 together with the rules shown in TABLE 4 as the access retrictions, thereby enabling the node N0 to receive the finely classified service.

In other words, the session key common to the node N0 and the node N included in the same domain D is sent to the node N0. Therefore, the node N0 is permitted to receive the service in the extent limited by the domain D. Further, with dividing the information concerning the service Bj into the provision information and the reception information, it is possible to perform the access restriction for each operation included in the service Bj. In other words, each node Ns can provide multiple services. Further, with determining the rule for the access restriction, it is enabled to limit an extent within which the service of the domain D is available.

For instance, the user U0 selects the service B2' such as the paid service of updating the firmware for the node N0 by use of the registering means RG1. In this instance, as shown in TABLE 4, the access restriction (ID0 read B2') and the access restriction (ID2 provide B2') are recorded in the user information database DBu. Therefore, when the node N0 obtains the session key used in the domain D2 from the authenticating means AM2, the node N0 is permitted to access only the limited service B2' such as the paid service of updating the firmware. The access restriction is recorded in the user information database DBu, and thereafter is recorded in the authenticating means AM (a corresponding one of the authentication databases DB1 to DB3), and further is recorded in the corresponding node N. Alternatively, the access restriction may be recorded in the corresponding node N after being recorded in both the user information database DBu and the authenticating means AM (a corresponding one of the authentication databases DB1 to DB3).

With regard to the access restriction for the service, the node trying to receive the service fails to access the node trying to provide the service, unless the access restriction regarding the reading process (read) is recorded in the node trying to receive the service and the access restriction regarding the providing process (provide) is recorded in the node trying to provide the service. The service becomes invisible where there is no correlation between the information of the access restriction to the node enjoying the service and the information of the access restriction to the node providing the service. Therefore, the above feature can be well utilized to conceal the availability of the service.

With reference to TABLE 4, the node N0 cannot recognize the service B2' of the node N2 unless the access restriction (N0 read B2') is recorded in the node N0 and the access restriction (N2 provide B2') is recorded in the node N2. If the setting regarding the above access restriction is not performed in at least one (actually, the node N0) of the node N0 (Nu) configured to receive the service and the node N2 (Ns) configured to provide the service, it is impossible for the node N0 to acknowledge the existence of the service B2'. Therefore, it is possible to conceal the service B2' from the node N0.

For instance, communication between the nodes in different domains may be enabled in accordance with a confidential relationship between the different domains. In this instance, the node is permitted to receive the specific service provided by the node in the different domain without changing its own domain.

Besides, the confidential relationship between the domains is used for the secure communication between the nodes through the plural domains in KryptoKnight. The presence of the confidential relationship between the different domains means that the different domains share their domain keys (secret keys).

Further, in the above instance, a set of the authenticating means AM and the authentication database storing means DS is provided for each domain D. In brief, the present system includes the three authenticating means AM1, AM2, and AM3, and the three authentication database storing means DS1, DS2, and DS3. However, the present system may include, instead of the three authenticating means AM1, AM2, and AM3, single authenticating means configured to function as the three authenticating means AM1, AM2, and AM3. The present system may include, instead of the three authentication database storing means DS1 to DS3, single authentication database storing means configured to function as the three authentication database storing means DS1 to DS3.

As described in the above, the present authentication system includes a plurality of the nodes, the authentication database, the authenticating means, the user information database, and the key distributing means. Each node is connected to the information communication network. The plurality of the nodes includes the node adapted to be used by a user, and the node configured to provide its service. The authentication database is configured to have information regarding a plurality of the domains defined with regard to the information communication network, and is configured to preliminarily store the different secret key for each domain with regard to the single node used by the user. The authenticating means is configured to search the authentication database with regard to the node and obtain the secret key corresponding to the domain including the node. The user information database is configured to store the account associating the node used by the user with the node configured to provide the service. The key distributing means is configured to, upon receiving the change request of the domain including the node from the same node used by the user, check whether or not the user information database stores the account regarding the node. The key distributing means is configured to, upon acknowledging that the user information database stores the account regarding the node, obtain the secret key corresponding to the post-changed domain of the node by use of the authenticating means, and send the obtained secret key to the node. The authenticating means is configured to, after obtaining the secret key which the node used by the user uses in the post-changed domain, create the session key which the node uses to communicate with the other node in the post-changed domain, and distribute, to the corresponding nodes, the session key authenticated in line with a message authentication manner by use of the secret key used in the post-changed domain.

In other words, the authentication system of the present embodiment includes the user node Nu, a plurality of the service nodes Ns, the authentication database storage unit DS, the authentication unit (authenticating unit) AM, the user information database storage unit DSu, and the key distribution unit (key distributing unit) KD1. The user node Nu is adapted to be used by a user. Each service node Ns is configured to provide a service corresponding to its domain. The authentication database storage unit DS is configured to store the authentication database (DB1, DB2, DB3) in which the secret key of the user node Nu is preliminarily registered for each domain D (D1, D2, D3). The secret key of the user node Nu is configured to differ according to a domain D. The user information database storage unit DSu is configured to store the user information database DBu in which the account used for associating a domain D with the user node Nu is registered. The user node Nu is configured to send the domain change request to the key distribution unit KD1 via the information communication network NT in order to request changing from the current domain D to which the user node Nu belongs to the desired domain D to which the user node Nu intends to belong. The key distribution unit KD1 is configured to, upon receiving the domain change request from the user node Nu, check whether or not the user information database DBu stores the account associating the desired domain D with the user node Nu. The key distribution unit KD1 is configured to, upon acknowledging that the user information database DBu stores the account associating the desired domain D with the user node Nu, obtain the secret key of the user node Nu associated with the desired domain D by user of the authentication database (DB1, DB2, DB3) stored in the authentication database storage unit DS, and send the obtained secret key to the user node Nu via the information communication network NT. The authentication unit AM is configured to, after the user node Nu obtains the secret key corresponding to the desired domain D, create the session key used for encryption communication between the user node Nu and the service node "Ns" belonging to the desired domain D within the desired domain D, and encrypt the created session key with the secret key corresponding to the desired domain D, and send the encrypted session key to the user node Nu via the information communication network NT.

According to the present embodiment, when the domain D including the node N0 used by the user is preliminarily recorded in the user information database DBu and the account is registered, the key distributing means KD1 sends the secret key corresponding to the domain D to the node N. Further, the session key is sent by use of the secret key. Consequently, with using the account for distributing the secret key, it is possible to change the domain D defined by the secret key in a secure manner. Further, the session key is distributed by use of the secret key prepared for each domain D. Therefore, the session key is used in only the corresponding domain D. Thus, it is possible to prevent the service from being provided beyond the domain D.

Further, the registering means may be attached to the user information database. The registering means is configured to register the account in response to manipulation of the input device adapted to be operated by a user.

In other words, according to a preferred aspect, the authentication system further includes the registration unit (registering means) RG1 connected to the user information database storage unit DSu. The registration unit RG1 is configured to record the account in the user information database DBu in response to manipulation of the input device IM adapted to be used by the user.

As explained in the above, the present embodiment includes the input device IM which the user uses in order to record the account in the user information database DBu. According to this configuration, the setting of the account and the distribution of the secret key are performed separately. Therefore, it is possible to improve the security of the distribution of the secret key.

Further, in a specific node of the domains, the node may provide a service of cooperating with the node used by the user. The registering means may be configured to record a set of the cooperating nodes as a group in the user information database in response to manipulation of the input device. The authenticating means may be configured to, upon being requested by the node used by the user to change its domain to the specific node, transmit the secret key for the specific domain to the user's node when the user information database stores the group including the user's node and the node of the specific domain.

In other words, according to a preferred aspect, the plurality of the nodes Ns includes the cooperation service node N3 configured to provide the service in which the cooperation service node N3 cooperates with the user node Nu. The registering means RG1 is configured to register a set of the user node Nu and the cooperation service node N3 in the user information database DBu as a group in response to manipulation of the inputting means (input device) IM. The key distribution unit KD1 is configured to, upon receiving the domain change request from the user node Nu, check whether or not the user information database DBu stores the account associating the desired domain D with the user node Nu and also stores the group indicative of the set of the user node Nu and the cooperation service node N3 belonging to the desired domain D. The key distribution unit is configured to, upon acknowledging that the user information database DBu stores the account associating the desired domain D with the user node Nu and also stores the group indicative of the set of the user node Nu and the cooperation service node N3 belonging to the desired domain D, obtain the secret key of the user node Nu associated with the desired domain D by user of the authentication database (DB1, DB2, DB3) stored in the authentication database storage unit, and send the obtained secret key to the user node Nu via the information communication network NT.

As mentioned in the above, the plural nodes N belonging to the same domain D is permitted to form a group and cooperate with each other. Here, the distribution of the secret key used in the domain D (D3) enabling the cooperation of the nodes N is permitted when the nodes N forming the group is recorded in the user information database DBu. According to this configuration, the group is confirmed in addition to the account of the user. Therefore, it is possible to distribute the secret key in a more secure manner.

Upon being requested by the node used by the user to change the current domain, the key distributing means sends the secret key of the new domain to the requesting node. Thereafter, upon receiving the acknowledgement from the requesting node, the key distributing means may delete the entry of the secret key used in the previous domain from the authentication database.

In other words, in a preferred aspect, the key distribution unit (key distributing means) KD1 is configured to, upon receiving the acknowledgement from the user node Nu after sending the secret key corresponding to the desired domain to the user node Nu in response to the domain change request, delete the secret key corresponding to the current domain D from the authentication database (DB1, DB2, DB3).

As described in the above, the secret key (the entry of the secret key) is deleted from the authentication database (DB1, DB2, DB3) in response to the reception of the acknowledgment after the distribution of the secret key to the node N. According to this configuration, it is possible to avoid a contradiction between the secret key held by the node N and the entry of the secret key in the authentication database (DB1, DB2, DB3) which would otherwise occur due to a failure of communication. Therefore, it is enabled to successfully change the domain D including the node N.

Upon acknowledging that the node used by the user no longer obtains the session key from the authenticating means, the node used by the user may try to obtain the session key corresponding to the other domain in line with the order preliminarily determined with regard to the domain to which the user node belongs.

In other words, in a preferred aspect, the user node Nu is configured to, upon acknowledging that the user node Nu no longer receives the session key corresponding to the current domain D from the authentication unit AM, request the session key corresponding to the other domain D in line with the order preliminarily determined with regard to the domain D to which the user node Nu belongs.

As apparent from the above, when the node Nu used by the user no longer obtains the session key from the authenticating means AM, the node Nu used by the user attempts to acquire the session key from the authenticating means AM of the other domain D. According to this configuration, it is possible to increase the possibility of restoring the communication in a priority order even if the communication using the session key is failed. For example, when the node fails to obtain the session key used in the domain D providing the paid service, the node requests the session key used in the domain D providing the free service. Therefore, the possibility of obtaining the session key by use of the secret key still stored in the node is given to the node. In such an instance, the node can obtain the session key and request the change of the domain D.

Moreover, the node providing the service may provide the services of different types. The authentication database may store information for performing the access restriction for each service provided by the node. The authenticating means may send the information for the access restriction to the nodes when distributing the session key to the nodes.

In other words, in a preferred aspect, the service node Ns is configured to provide the services of different classes. The authentication database (DB1, DB2, DB3) is configured to store the access restriction information for performing the access restriction for each service provided by the service node Ns. The authentication unit AM is configured to send the access restriction information to the user node Nu and the service node Ns when distributing the session key to the user node Nu and the service node Ns.

As described in the above, when the node providing the service provides the services of different types, the access restriction is performed for each service on the basis of the information stored in the authentication database (DB1, DB2, DB3). According to this configuration, the available range of the service is limited by the range of the domain and further the accessible range is determined for each service. Therefore, it is possible to provide the service within a more limited range. For example, when the domain D offering the paid service is provided, the access restriction is performed for each service. With this arrangement, it is possible to provide different service with regard to each of different fees.

The invention claimed is:

1. An authentication system comprising:
a user node adapted to be used by a user;
a plurality of service nodes each configured to provide a service corresponding to a domain to which a service node belongs;
an authentication database storage unit;
an authentication unit;
a user information database storage unit; and
a key distribution unit,
wherein said authentication database storage unit is configured to store an authentication database in which a secret key of said user node is preliminarily registered for each domain,
the secret key of said user node being configured to differ according to a domain,
said user information database storage unit being configured to store a user information database in which an account used for associating a domain with said user node is registered,
said user node being configured to send a domain change request to said key distribution unit via an information communication network in order to request changing from a current domain to which said user node belongs to a desired domain to which said user node intends to belong,
said key distribution unit being configured to, upon receiving the domain change request from said user node, check whether or not the user information database stores the account associating the desired domain with said user node, said key distribution unit being configured to, upon acknowledging that the user information database stores the account associating the desired domain with said user node, obtain the secret key of said user node associated with the desired domain by use of the authentication database stored in said authentication database storage unit, and send the obtained secret key to said user node via the information communication network, and
said authentication unit being configured to, after said user node obtains the secret key corresponding to the desired domain, create a session key used for encryption communication between said user node and said service node belonging to the desired domain within the desired domain, and encrypt the created session key with the secret key corresponding to the desired domain, and send the encrypted session key to said user node via the information communication network.

2. An authentication system as set forth in claim 1, wherein said authentication system further comprises a registration unit connected to said user information database storage unit, said registration unit being configured to register the account in the user information database in response to manipulation of an input device adapted to be used by the user.

3. An authentication system as set forth in claim 1, wherein said key distribution unit is configured to, upon receiving an acknowledgement from said user node after sending the secret key corresponding to the desired domain to said user node in response to the domain change request, delete the secret key corresponding to the current domain from the authentication database.

4. An authentication system as set forth in claim 1, wherein said user node is configured to, upon acknowledging that said user node no longer receives the session key corresponding to the current domain from said authentication unit, request the session key corresponding to the other domain in line with an order preliminarily determined with regard to the domain to which said user node belongs.

5. An authentication system as set forth in claim 1, wherein said service node is configured to provide the services of different classes, said authentication database being configured to store access restriction information for performing access restriction for each service provided by said service node, and said authentication unit being configured to send the access restriction information to said user node and said service node when distributing the session key to said user node and said service node.

6. An authentication system comprising:

a user node adapted to be used by a user;

a plurality of service nodes each configured to provide a service corresponding to a domain to which a service node belongs;

an authentication database storage unit;

an authentication unit;

a user information database storage unit;

a registration unit connected to said user information database storage unit; and a key distribution unit, wherein said authentication database storage unit is configured to store an authentication database in which a secret key of said user node is preliminarily registered for each domain, the secret key of said user node being configured to differ according to a domain, said user information database storage unit being configured to store a user information database in which an account used for associating a domain with said user node is registered, said registration unit being configured to register the account in the user information database in response to manipulation of an input device adapted to be used by the user, said user node being configured to send a domain change request to said key distribution unit via an information communication network in order to request changing from a current domain to which said user node belongs to a desired domain to which said user node intends to belong, the plurality of said nodes includes a cooperation service node configured to provide a service in which said cooperation service node cooperates with said user node, said registration unit being configured to register a set of said user node and said cooperation service node in the user information database as a group in response to manipulation of the input device, said key distribution unit being configured to, upon receiving the domain change request from said user node, check whether or not the user information database stores the account associating the desired domain with said user node and also stores the group indicative of the set of said user node and said cooperation service node belonging to the desired domain, said key distribution unit being configured to, upon acknowledging that the user information database stores the account associating the desired domain with said user node and also stores the group indicative of the set of said user node and said cooperation service node belonging to the desired domain, obtain the secret key of said user node associated with the desired domain by user of the authentication database stored in said authentication database storage unit, and send the obtained secret key to said user node via the information communication network, and said authentication unit being configured to, after said user node obtains the secret key corresponding to the desired domain, create a session key used for encryption communication between said user node and said service node belonging to the desired domain within the desired domain, and encrypt the created session key with the secret key corresponding to the desired domain, and send the encrypted session key to said user node via the information communication network.

* * * * *